(12) United States Patent
Kanda et al.

(10) Patent No.: US 10,447,919 B2
(45) Date of Patent: Oct. 15, 2019

(54) IMAGING DEVICE, EXTERNAL DEVICE, IMAGING SYSTEM, IMAGING METHOD, OPERATING METHOD, AND COMPUTER-READABLE RECORDING MEDIUM

(71) Applicant: OLYMPUS CORPORATION, Hachioji-shi, Tokyo (JP)

(72) Inventors: Kazuo Kanda, Higashiyamato (JP); Yoshiyuki Fukuya, Sagamihara (JP); Kazuhiko Shimura, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/918,740

(22) Filed: Mar. 12, 2018

(65) Prior Publication Data

US 2018/0270412 A1    Sep. 20, 2018

(30) Foreign Application Priority Data

Mar. 14, 2017  (JP) ................. 2017-049006

(51) Int. Cl.
*H04N 5/232*  (2006.01)
*H04N 1/21*   (2006.01)

(52) U.S. Cl.
CPC ......... *H04N 5/23216* (2013.01); *H04N 1/212* (2013.01); *H04N 5/23296* (2013.01); *H04N 5/232933* (2018.08); *H04N 5/232935* (2018.08)

(58) Field of Classification Search
CPC ............... H04N 5/23216; H04N 1/212; H04N 5/23203; H04N 5/23206; H04N 5/23296; H04N 5/232933
See application file for complete search history.

(56) References Cited

U.S. PATENT DOCUMENTS

2013/0258125 A1\* 10/2013 Aono ................. H04N 5/23216
                                                              348/211.4

FOREIGN PATENT DOCUMENTS

JP          2012-134810 A      7/2012

\* cited by examiner

*Primary Examiner* — Ahmed A Berhan
(74) *Attorney, Agent, or Firm* — Volpe and Koenig, P.C.

(57) ABSTRACT

An imaging device includes: a capture control unit configured to control the imaging device to execute movie capture while performing capture parameter alternation control based on capture parameter control information received from an external device, the capture parameter control information instructing alternation of a capture parameter, the alternation being changed in time series.

3 Claims, 19 Drawing Sheets

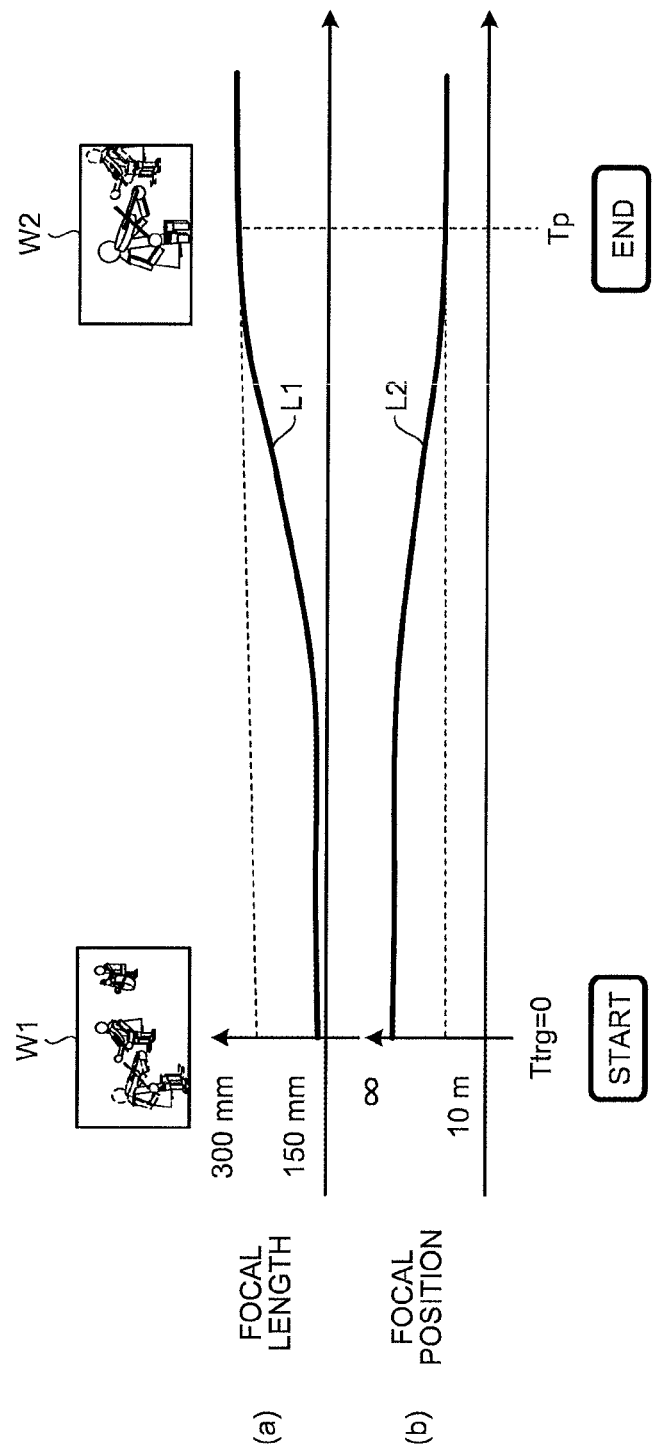

IMAGING DEVICE, EXTERNAL DEVICE, IMAGING SYSTEM, IMAGING METHOD, OPERATING METHOD, AND COMPUTER-READABLE RECORDING MEDIUM

CROSS-REFERENCE TO RELATED APPLICATIONS

This application is based upon and claims the benefit of priority from Japanese Patent Application No. 2017-049006, filed on Mar. 14, 2017, the entire contents of which are incorporated herein by reference.

BACKGROUND

The present disclosure relates to an imaging device, an external device, an imaging system, an imaging method, an operating method, and a computer-readable recording medium.

In recent years, a technique of automatically obtaining a transition effect by focusing at the start or at the end of movie capture in an imaging device such as a digital camera is known (for example, Japanese Laid-Open Patent Publication No. 2012-134810). In this technique, the transition effect by focusing is automatically added by once changing a focal point state of a capture optical system according to a recording start instruction or a recording end instruction of the movie capture, and then returning the focal point state of the capture optical system to the state before change.

By the way, a user sometimes wishes to add an arbitrary transition effect even during movie capture. When adding a desired transition effect during movie capture, the user needs to manually change the focal point state of the imaging optical system or move the imaging device to change a capture region. Therefore, vibration at the change operation is transferred to the imaging device and camera shake or the like may occur, or the user misses a desired object and may fail the movie capture, and thus a sophisticated technique is necessary. In other words, a photographer who captures a movie with the imaging device only needs to concentrate on smoothly tracking an object when the object is moving, and pay attention to camera shake and the like and frame an object when the object stands still. That is, the external device wirelessly controls and assists the capture parameter and the like that a capturing device wants to change during capture, and thus does not disturb framing.

There is a need for an imaging device, an external device, an imaging system, an imaging method, an operating method, and a program, which enable easy addition of a desired transition effect to a movie and capture of the movie in cooperation with the external device even during capture of the movie.

SUMMARY

An imaging device according to one aspect of the present disclosure may include: a capture control unit configured to control the imaging device to execute movie capture while performing capture parameter alternation control based on capture parameter control information received from an external device, the capture parameter control information instructing alternation of a capture parameter, the alternation being changed in time series.

An external device according to another aspect of the present disclosure may bidirectionally communicate with an imaging device, and include: a setting unit configured to set capture parameter control information instructing alternation of a capture parameter of the imaging device, the alternation being changed in time series; and a transmission control unit configured to transmit the capture parameter control information set by the setting unit to the imaging device.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 6 is a diagram schematically illustrating change patterns determined according to either one of focal position information and angle of view information set by the external device according to the first embodiment, and time information;

DETAILED DESCRIPTION

Hereinafter, embodiments will be described with reference to the drawings. Note that the present disclosure is not limited by the embodiments below. Further, the same portions are denoted with the same sign in illustration of the drawings.

First Embodiment

Configuration of Imaging System

Figure 1:
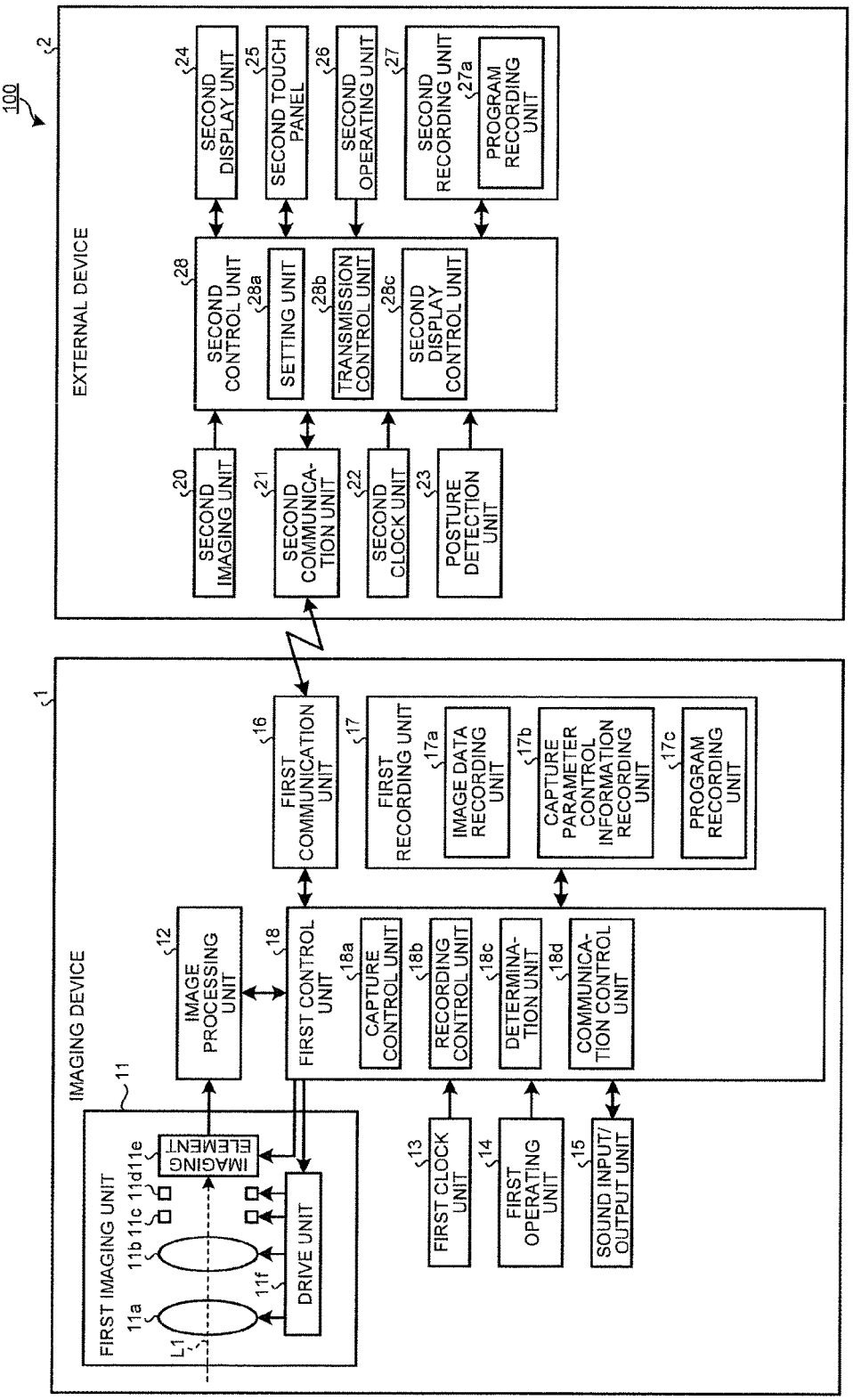
FIG. 1 is a block diagram illustrating a functional configuration of an imaging system according to a first embodiment.

FIG. 1 is a block diagram illustrating a functional configuration of an imaging system according to a first embodiment. An imaging system 100 illustrated in FIG. 1 includes an imaging device 1 that sequentially images an object and generates movie data or still image data of the object, and an external device 2 that displays an image corresponding to the image data transmitted from the imaging device 1 and instructs the imaging device 1 to perform various operations. The imaging device 1 and the external device 2 are bidirectionally communicatively connected by wireless or wired means.

The imaging device 1 is configured from a digital still camera or the like capable of sequentially capturing image data. The imaging device 1 may be configured from a camcorder, a digital video camera, a mobile phone or a tablet terminal having an imaging function, a surveillance camera, an IC recorder having a capture function, an endoscope, or a microscope such as a video microscope, other than the digital still camera. If you perform a wrong operation while capturing a movie, the wrong operation is captured and recorded as it is, and the recorded movie provides a feeling of discomfort. Further, a movie that has been lengthily captured lacks sharpness and brings a feeling of exhaustion at the time of observation or appreciation. By adopting the configuration described below, a technique that provides an effect and dramatic impact as needed with stable framing may be provided.

The external device 2 is configured from a mobile phone. The external device 2 may be configured from a tablet terminal, an external recorder having at least a display function, an operation input function, and a recording function, an image processing device having a display function and an operation input function, a personal computer, or the like, other than the mobile phone.

Detailed Configuration of Imaging Device

Next, a detailed configuration of the above-described imaging device 1 will be described.

As illustrated in FIG. 1, the imaging device 1 includes a first imaging unit 11, an image processing unit 12, a first clock unit 13, a first operating unit 14, a sound input/output unit 15, a first communication unit 16, a first recording unit 17, and a first control unit 18.

The first imaging unit 11 images an object and outputs still image data of the object to the image processing unit 12 under control of the first control unit 18. Further, the first imaging unit 11 sequentially images an object, generates movie data of the object, and outputs the movie data to the image processing unit 12 under control of the first control unit 18. The first imaging unit 11 includes a zoom lens unit 11a, a focus lens unit 11b, a diaphragm 11c, a shutter 11d, an imaging element 11e, and a drive unit 11f.

The zoom lens unit 11a is configured from one or a plurality of lenses, and changes an angle of view of the imaging device 1 by being moved on an optical axis L1 under the drive of the drive unit 11f. That is, the zoom lens unit 11a functions as an angle of view change function.

The focus lens unit 11b is configured from one or a plurality of lenses, and changes a focal position of the imaging device 1 by being moved on the optical axis L1 under the drive of the drive unit 11f. That is, the focus lens unit 11b functions as a focus adjustment function.

The diaphragm 11c adjusts a depth of field and exposure of the imaging device 1 by controlling an incident amount of light condensed via the zoom lens unit 11a and the focus lens unit 11b under the drive of the drive unit 11f.

The shutter 11d alters the state of the imaging element 11e to an exposure state or a light shielding state under the drive of the drive unit 11f.

The imaging element 11e is configured from a charge coupled device (CCD), a complementary metal oxide semiconductor (CMOS), or the like, and generates image data or movie data by receiving an optical image (object image) entering via the zoom lens unit 11a, the focus lens unit 11b, and the diaphragm 11c and performing photoelectric conversion.

The drive unit 11f is configured from any one of a stepping motor, a voice coil motor, and a DC motor, and moves the zoom lens unit 11a and the focus lens unit 11b on the optical axis L1 and adjusts a diaphragm value of the diaphragm 11c under the first control unit 18.

The image processing unit 12 performs predetermined image processing for the image data or the movie data input from the first imaging unit 11 and records the image data to the first recording unit 17 via the first control unit 18 under control of the first control unit 18. Here, the predetermined image processing is basic image processing including white balance processing, γ correction, format conversion processing, compression processing, and the like. Note that the image processing unit 12 may cut out a predetermined region of an image corresponding to the image data to generate a trimmed image (functions as electronic zooming).

The first clock unit 13 generates date and time information regarding date and time of the image data or the movie data captured by the first imaging unit 11 and outputs the date and time information to the first control unit 18, in addition to a clocking function.

The first operating unit 14 is configured from buttons, switches, and the like, and receives inputs of various operations regarding the imaging device 1.

The sound input/output unit 15 acquires sound information, generates sound data of the acquired sound information, and outputs the sound data to the first control unit 18, and outputs sound data input from the first control unit 18 to an outside. The sound input/output unit 15 is configured from a microphone that acquires the sound data, an A/D converter that performs A/D conversion for the sound data acquired by the microphone, a D/A converter that performs D/A conversion for digital sound data input from the first control unit 18, a speaker that outputs analog sound data converted by the D/A converter to an outside, and the like. Note that, in the first embodiment, the sound input/output unit 15 functions as a sound acquisition unit.

The first communication unit 16 transmits information such as the image data and the movie data by bidirectionally communicating with the external device 2 and another device, and receives instruction signals that instruct various operations of the imaging device 1, the instruction signals having been transmitted from the external device 2, and outputs the instruction signals to the first control unit 18, according to a predetermined wireless communication standard under control of the first control unit 18. Here, examples of the predetermined wireless communication standard include IEEE802.11a, IEEE802.11b, IEEE802.11n, IEEE802.11g, IEEE802.11ac, Bluetooth (registered trademark), and infrared communication standard. Note that, in the first embodiment, any of the wireless communication standards is applicable. Note that, in the first embodiment, a case of using wireless communication will be described. However, in a case of using wired communication, an interface based on a predetermined communication standard may be used. Although the first communication unit 16 has been collectively described, respective antennas and wireless circuits may be provided so that the communication through a plurality of standards may be selectively used. For example, the first communication unit 16 may be provided with a wireless communication function compatible with at least Bluetooth and IEEE802.11ac.

The first recording unit 17 is configured from a synchronous dynamic random access memory (SDRAM), a flash memory, a memory card, and the like, and records various programs to be executed by the imaging device 1, the image data, the movie data, and various types of setting information. The first recording unit 17 includes an image data recording unit 17a that records the image data and the movie data, a capture parameter control information recording unit 17b that records capture parameter control information for altering a capture parameter of the first imaging unit 11 before or during movie capture of the imaging device 1, the capture parameter control information having been transmitted from the external device 2, and a program recording unit 17c that records various programs to be executed by the imaging device 1.

The first control unit 18 integrally controls the units that configure the imaging device 1. The first control unit 18 is configured from a general-purpose processor such as a central processing unit (CPU), a field programmable gate array (FPGA), or an application specific integrated circuit (ASIC).

Here, a detailed configuration of the first control unit 18 will be described. The first control unit 18 includes a capture control unit 18a, a recording control unit 18b, a determination unit 18c, and a communication control unit 18d.

The capture control unit 18a controls capture of the first imaging unit 11. To be specific, when an instruction signal instructing still image capture or movie capture is input from the external device 2 via the first communication unit 16, the capture control unit 18a causes the first imaging unit 11 to execute capture. Further, the capture control unit 18a causes the first imaging unit 11 to execute the movie capture while performing capture parameter alternation control to change the capture parameter of the first imaging unit 11 in time series at the movie capture, based on the capture parameter control information instructing alternation of the capture parameter of the first imaging unit 11, the alternation being changed in time series, the capture parameter control information having been received from the external device 2 via the first communication unit 16, before or during the movie capture. For example, the capture control unit 18a performs the movie capture while altering the focal position and the angle of view of the first imaging unit 11 based on the capture parameter control information. Further, the capture control unit 18a starts the capture parameter alternation control based on a determination result of the determination unit 18c described below or the instruction signal from the external device 2.

The recording control unit 18b records the still image data or the movie data generated by the first imaging unit 11 to the first recording unit 17 according to a predetermined format.

The determination unit 18c determines whether the first imaging unit 11 is at start timing of the capture parameter alternation control based on a start condition included in the capture parameter control information. The determination unit 18c determines that the first imaging unit 11 is at the start timing of the capture parameter alternation control, when timing is at least one of when a change amount of the movie data exceeds a threshold, when a sound volume of the sound data exceeds a threshold, and when posture information indicating a posture of the external device 2, the posture information being sequentially transmitted from the external device 2, indicates a preset posture state.

The communication control unit 18d controls communication with the external device 2 or another device by the first communication unit 16. The communication control unit 18d transmits the still image data or the movie data generated by the first imaging unit 11 to an outside via the first communication unit 16.

Detailed Configuration of External Device

Next, a detailed configuration of the above-described external device 2 will be described. As illustrated in FIG. 1, the external device 2 includes a second imaging unit 20, a second communication unit 21, a second clock unit 22, a posture detection unit 23, a second display unit 24, a second touch panel 25, a second operating unit 26, a second recording unit 27, and a second control unit 28.

The second imaging unit 20 has a similar function to the first imaging unit 11, and images an object to generate image data or movie data and outputs the generated image data or movie data to the second control unit 28 under control of the second control unit 28.

The second communication unit 21 performs bidirectional communication with the imaging device 1 or an external device according to a predetermined wireless communication standard under control of the second control unit 28. The second communication unit 21 transmits the instruction signals that instruct various operations of the imaging device 1, and outputs the image data and the movie data received from the imaging device 1 to the second control unit 28. Although the second communication unit 21 has been collectively described, respective antennas and wireless circuits may be provided so that the communication through a plurality of standards may be selectively used. For example, simple commands, and images and files may be communicated by communication of different standards. Since the information amount of communication for capture or for various types of setting is small, the communication is stabilized if the communication is performed that does not disturb transmission of large-volume images. It goes without saying that such information may be included and communicated in the communication of images.

The second clock unit 22 generates date and time information regarding date and time of the image data or the movie data captured by the second imaging unit 20 and outputs the date and time information to the second control unit 28, in addition to a clocking function.

The posture detection unit 23 detects a posture or camera shake regarding the external device 2, and outputs a detection result to the second control unit 28. The posture detection unit 23 is configured from an acceleration sensor that detects acceleration caused in the external device 2, a gyro sensor that detects an angle, angular velocity, and angular acceleration of the external device 2, and the like. Note that posture information or gestures regarding postures including the position of the external device 2 and the azimuth in a capture direction may be detected by additionally including a position detection sensor, an azimuth sensor, and the like by a GPS or the like to the configuration of the posture detection unit 23.

The second display unit 24 displays information and images corresponding to the image data input via the second control unit 28 under control of the second control unit 28. The second display unit 24 is configured from liquid crystal, organic electro luminescence (EL), or the like.

The second touch panel 25 is provided to be superimposed on a display area of the second display unit 24, and receives an input of a signal according to a contact position (touched position) that an object from an outside comes in contact with and outputs the signal to the second control unit 28.

The second operating unit 26 receives inputs of signals regarding various operations of the external device 2, and outputs the received signals to the second control unit 28. The second operating unit 26 is configured from switches, buttons, and the like. Note that, in the first embodiment, the second touch panel 25 and the second operating unit 26 function as an input unit.

The second recording unit 27 is configured from an SDRAM, a flash memory, a memory card, and the like, and records various programs to be executed by the external device 2, the image data, the movie data, and various types of setting information. The second recording unit 27 includes a program recording unit 27a that records various programs to be executed by the external device 2.

The second control unit 28 integrally controls the units that configure the external device 2. The second control unit 28 is configured from a general-purpose processor such as a CPU, an FPGA, or an ASIC.

Here, a detailed configuration of the second control unit 28 will be described. The second control unit 28 includes a setting unit 28a, a transmission control unit 28b, and a second display control unit 28c.

The setting unit 28a sets capture parameter control information instructing alternation of the capture parameter of the imaging device 1 (first imaging unit 11), the alternation being changed in time series, before or during the movie capture of the imaging device 1. To be specific, the setting unit 28a sets the capture parameter before and after alternation in a transition period from start to end of the capture parameter alternation control performed by the imaging device 1, time information specifying a time of the transition period from start to end of the capture parameter alternation control of the imaging device 1, and a change pattern indicating temporal change of the capture parameter of the imaging device 1, as the capture parameter control information, according to an operation received by the second touch panel 25 or the second operating unit 26. Further, the setting unit 28a sets at least either one of focal position information specifying focal positions of the imaging device 1 at the start or at the end of the transition period from start to end of the capture parameter alternation control, and angle of view information specifying angles of view of the imaging device 1 at the start or at the end of the transition period from start to end of the capture parameter alternation control, as the capture parameter control information.

The transmission control unit 28b transmits the capture parameter control information set by the setting unit 28a to the imaging device 1 via the second communication unit 21. Further, the transmission control unit 28b transmits various types of information for which an operation has been received by the second touch panel 25 or the second operating unit 26 to the imaging device 1 via the second communication unit 21. For example, the transmission control unit 28b transmits an instruction signal instructing still image capture or movie capture for which an input has been received by the second touch panel 25 to the imaging device 1 via the second communication unit 21.

The second display control unit 28c controls a display mode of the second display unit 24. To be specific, the second display control unit 28c causes the second display unit 24 to display the still image data or the movie data generated by the imaging device 1, which has been input via the first communication unit 16. Further, the second display control unit 28c causes the second display unit 24 to display the various types of information regarding the external device 2, and the still image data or the movie data generated by the second imaging unit 20.

Processing by External Device

Figure 2:
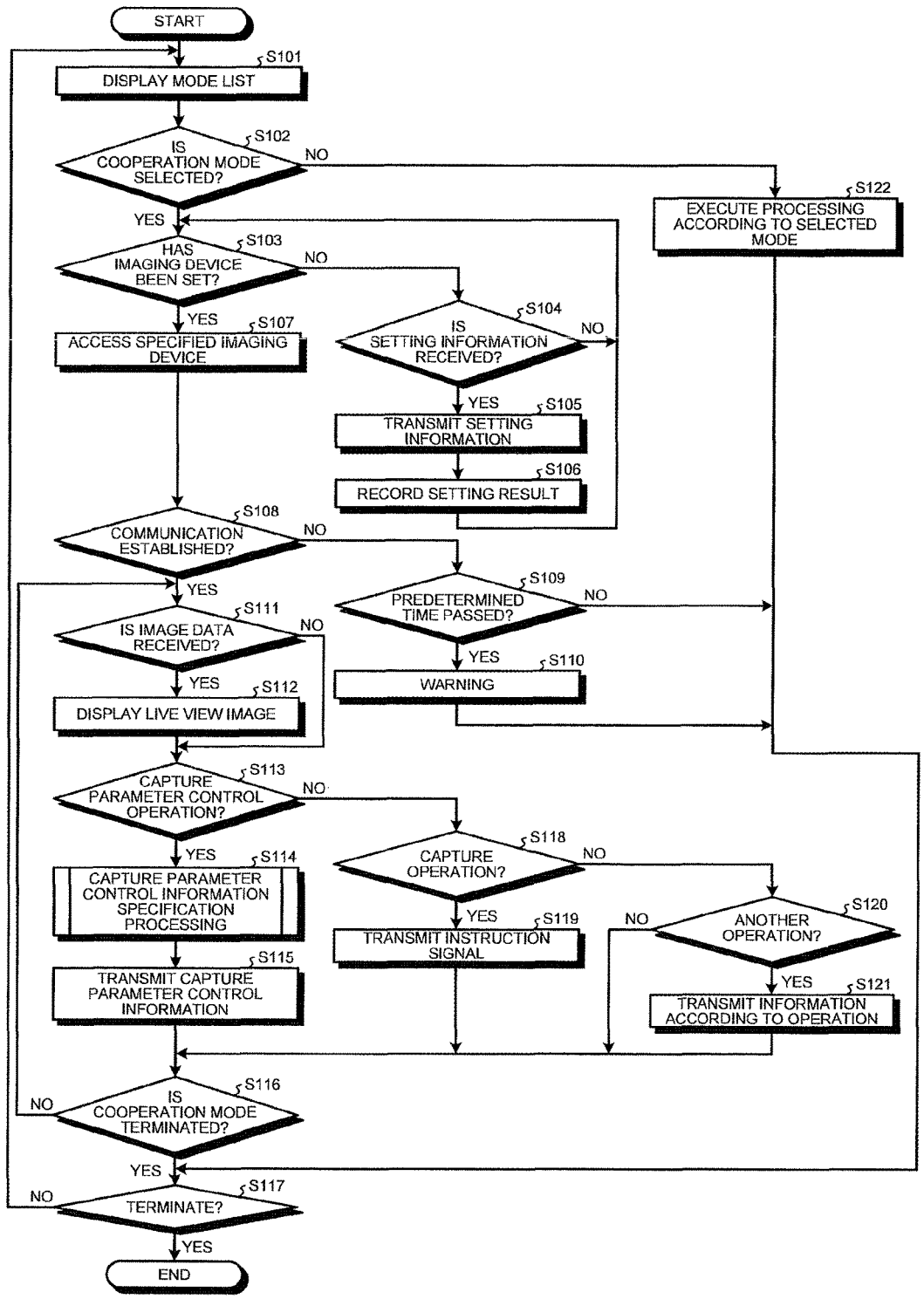
FIG. 2 is a flowchart illustrating an outline of processing executed by an external device according to the first embodiment.

Next, processing executed by the external device 2 will be described. FIG. 2 is a flowchart illustrating an outline of processing executed by the external device 2.

As illustrated in FIG. 2, the second display control unit 28c causes the second display unit 24 to display a list of a plurality of modes executable by the external device 2 (Step S101).

Next, when a cooperation mode cooperating with the imaging device 1 is selected via the second touch panel 25 or the second operating unit 26 (Step S102: Yes), the external device 2 proceeds to Step S103 described below. On the other hand, when the cooperation mode cooperating with the imaging device 1 is not selected via the second touch panel 25 or the second operating unit 26 (Step S102: No), the external device 2 proceeds to Step S122.

In Step S103, when various types of information for performing bidirectional communication have been set with the imaging device 1 (Step S103: Yes), the external device 2 proceeds to Step S107 described below. On the other hand, when the various types of information for performing bidirectional communication have not been set with the imaging device 1 (Step S103: No), the external device 2 proceeds to Step S104 described below.

In Step S104, when setting information is received from the imaging device 1 via the second communication unit 21 (Step S104: Yes), the transmission control unit 28b transmits setting information regarding the external device 2 itself to the imaging device 1 via the second communication unit 21 (Step S105), and records a setting result received from the imaging device 1 to the second recording unit 27 (Step S106). Here, the setting information includes address information of the imaging device 1, a password corresponding to the address information, and the like. After Step S106, the external device 2 returns to Step S103 described above. The setting information and the image to be communicated later may be communicated by different communication standards, and different circuits and antennas may be selectively used.

In Step S104, when the setting information is not received from the imaging device 1 via the second communication unit 21 (Step S104: No), the external device 2 returns to Step S103 described above.

In Step S107, the second control unit 28 accesses the imaging device 1 to be specified. To be specific, the second control unit 28 accesses the imaging device 1 corresponding to the setting information recorded in the second recording unit 27 via the second communication unit 21.

Next, when communication with the imaging device 1 is established (Step S108: Yes), the external device 2 proceeds to Step S111 described below. On the other hand, when the communication with the imaging device 1 is not established (Step S108: No), the external device 2 proceeds to Step S109 described below.

When a predetermined time (for example, 120 seconds) has passed since accessing the imaging device 1 (Step S109: Yes) in Step S109, the second display control unit 28c causes the second display unit 24 to display a warning (Step S110). For example, the second display control unit 28c again causes the second display unit 24 to display a message indicating that the communication with the imaging device 1 could not be established. After Step S110, the external device 2 proceeds to Step S117 described below. On the other hand, when the predetermined time has not passed since accessing the imaging device 1 (Step S109: No), the external device 2 proceeds to Step S117 described below.

In Step S111, when image data is received from the imaging device 1 via the second communication unit 21 (Step S111: Yes), the second display control unit 28c causes the second display unit 24 to display a live view image corresponding to the image data (Step S112). After Step S112, the external device 2 proceeds to Step S113 described below. The image communication, and the above-described setting information or capture parameter communication described below may be communicated by different communication standards, and different circuits and antennas may be selectively used to enable both communications at the same time.

In Step S111, when the image data has not been received from the imaging device 1 via the second communication unit 21 (Step S111: No), the external device 2 proceeds to Step S113 described below.

In Step S113, the second control unit 28 determines whether a capture parameter control operation by the user has been performed. To be specific, as illustrated in FIG. 3, the second control unit 28 determines whether the capture parameter control operation has been performed by determining whether a capture control icon A1 on a live view image LV1 displayed in the second display unit 24 of the external device 2 has been touched by a user U1 via the second touch panel 25.

Figure 3:
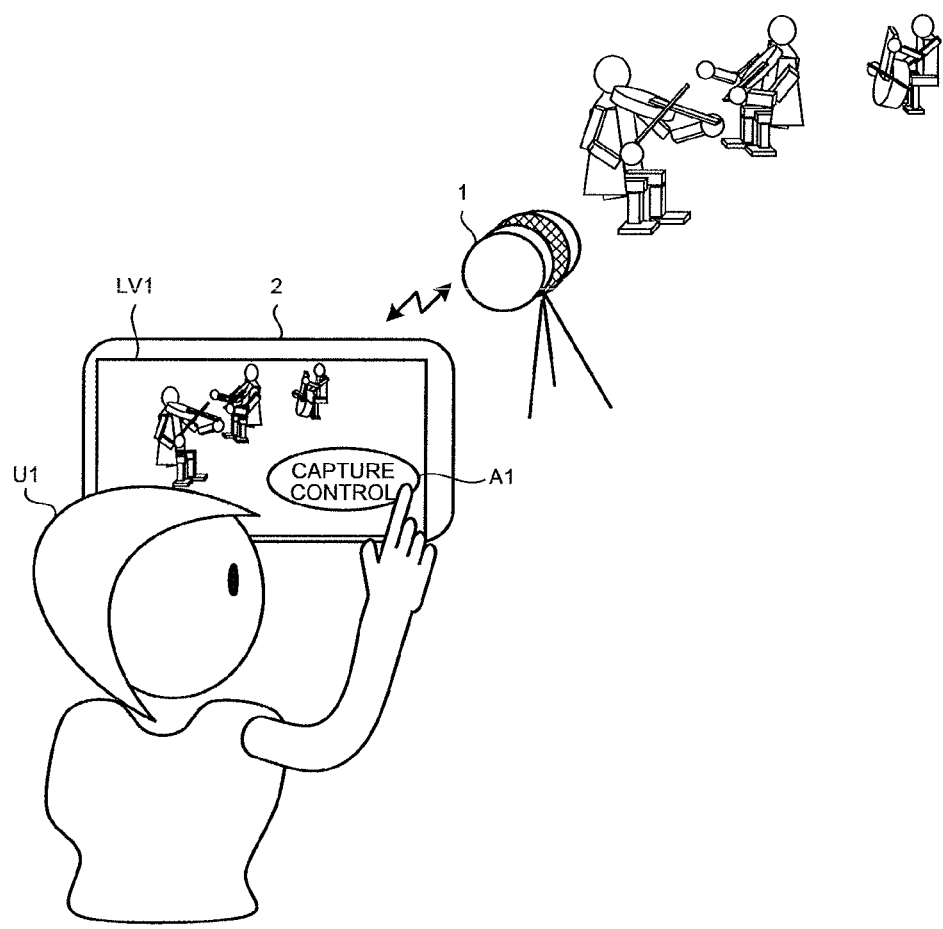
FIG. 3 is a diagram illustrating a situation where a movie is captured using the imaging system according to the first embodiment.

As illustrated in FIG. 3, in a situation where the highlight scene changes one after another like capturing of a concert, and the user wishes to capture the scene with a movie effect in accordance with the change, it is very difficult for the user U1 to perform an operation to simultaneously provide an effect in immediate response to things that are happening before the user's face, and an operation mistake and the like occur due to stress. For this reason, the user U1 may not perform capture with a desired effect unless treating various variables such as timing and an angle of view even in a simple zoom operation. Of course, in addition to or other than the operation, there may also be an operation to change the exposure and focus at the same time, and thus the operation is not just a work load that may be handled by the one user U1 (photographer) at the same time as capturing. A desired movie may not be obtained without ingenuity in temporal allocation of such work (if some work is performed earlier, the operation will be automatically done later). Here, use in capture and recording is mainly assumed. However, at observation without recording, observation setting in the next scene, object, or condition may be naturally and comfortably performed without waste by such ingenuity, and smooth observation and check may be performed. With such ingenuity, trial and error becomes possible and an optimum effect may be provided. However, if such a trial and error operation is performed at the same time as capture of the scene, the timing may be off or the trial and error may be captured. Preventing such matters is also one of objectives. This operation for the desired movie may be performed while viewing the live view image LV1, and thus even if the operation does not follow a predetermined scenario, the operation may be made optimum corresponding to the scene while viewing the scene.

When the second control unit 28 determines in Step S113 that the capture parameter control operation by the user U1 has been performed (Step S113: Yes), the external device 2 proceeds to Step S114 described below. On the other hand, when the second control unit 28 determines that the capture parameter control operation by the user U1 is not performed (Step S113: No), the external device 2 proceeds to Step S118 described below.

In Step S114, the external device 2 executes, for the imaging device 1, capture parameter control information specification processing of setting the capture parameter control information instructing alternation of the capture parameter of the first imaging unit 11, the alternation being changed in time series before or during movie capture. After Step S114, the external device 2 proceeds to Step S115 described below.

Capture Parameter Control Information Specification Processing

Figure 4:
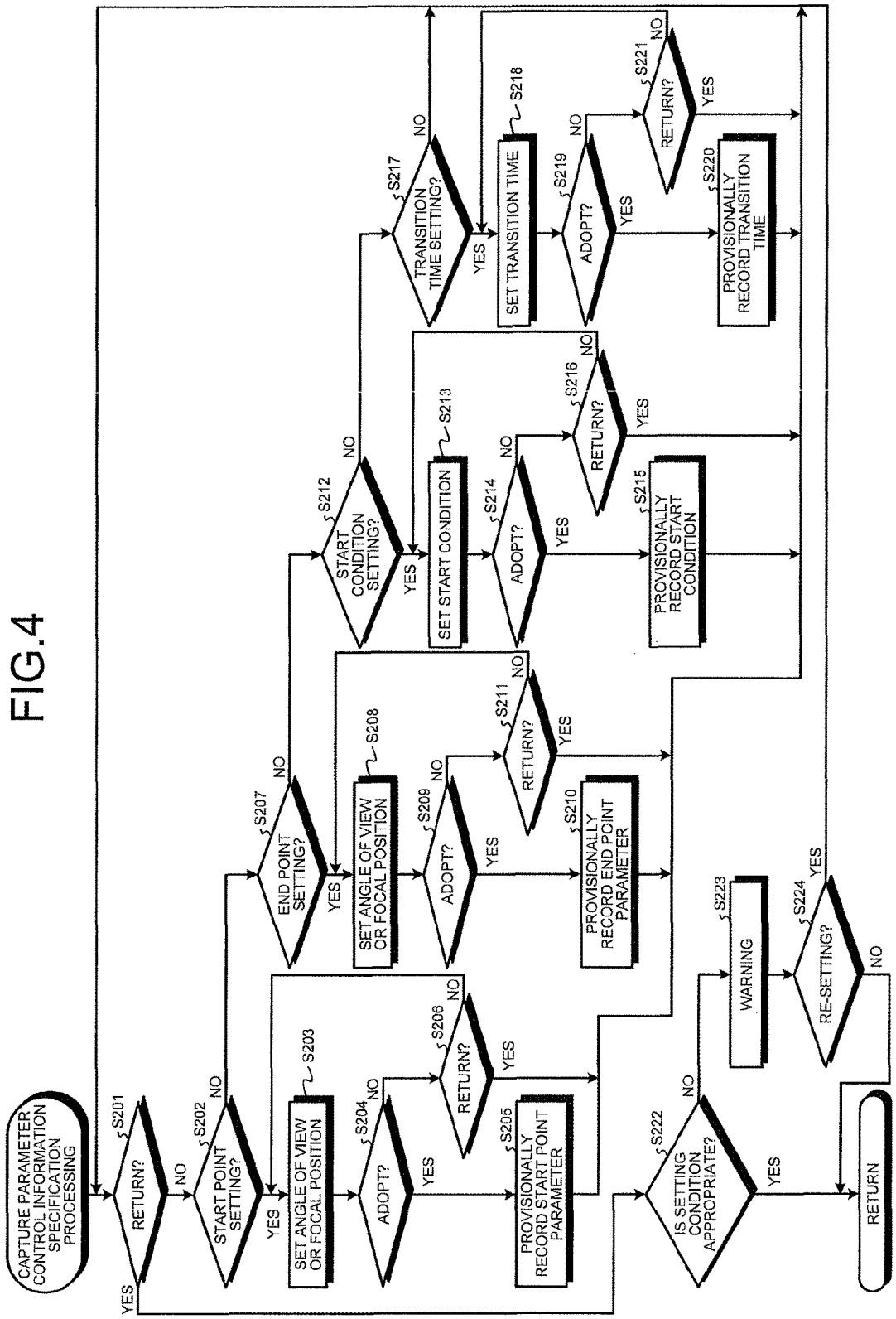
FIG. 4 is a flowchart illustrating an outline of capture parameter control information specification processing in FIG. 2.

FIG. 4 is a flowchart illustrating an outline of capture parameter control information specification processing described in Step S114 in FIG. 2. At this timing, an operation may be performed while viewing the live view image LV1, and thus even if the operation does not follow a predetermined scenario, the operation may be made optimum corresponding to an actual situation while viewing the scene. The optimum effect may be provided as described above and such a trial and error operation is performed while viewing the live view image LV1, and there is an advantage that the operation does not affect capture and observation when the scene actually comes.

Figure 5A:
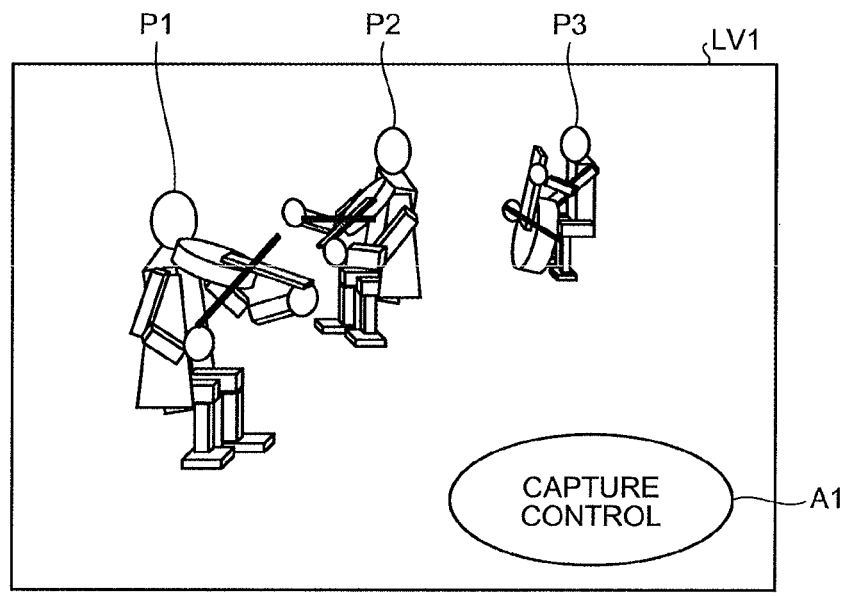
FIG. 5A is a diagram illustrating an example of an image displayed by the external device according to the first embodiment.
Figure 5B:
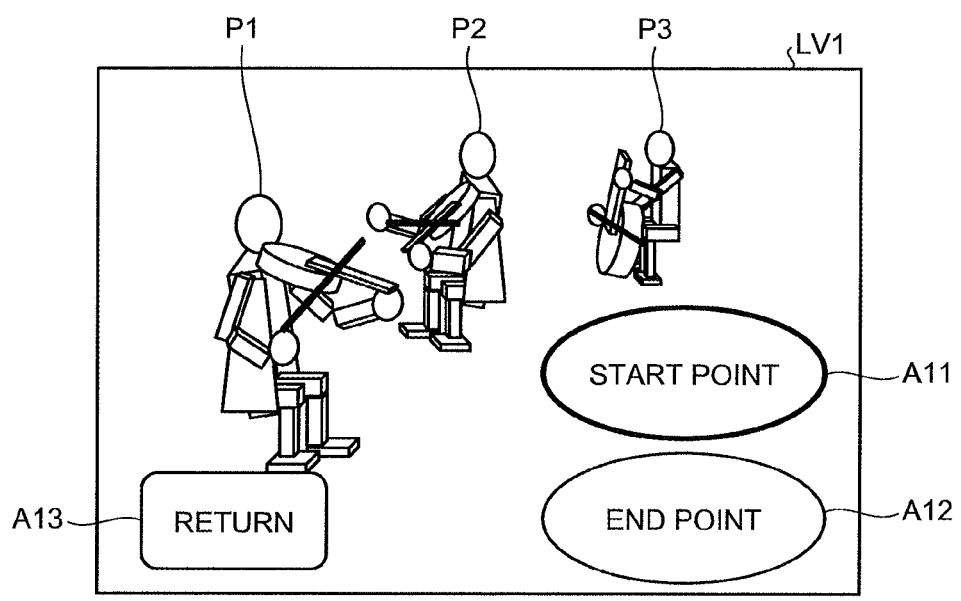
FIG. 5B is a diagram illustrating an example of an image displayed by the external device according to the first embodiment.

As illustrated in FIG. 4, first, the second control unit 28 determines whether return via the second touch panel 25 is selected (Step S201). For example, as illustrated in FIGS. 5A and 5B, after the user touches the capture control icon A1 via the second touch panel 25 (see FIG. 5A), the second display control unit 28c superimposes a start point icon A11, an end point icon A12, and a return icon A13 on the live view image LV1 and causes the second display unit 24 to display the superimposed image (see FIG. 5B). The start point icon A11 receives an input of an instruction signal for setting a start point serving as a reference for setting the capture parameter control information that changes the capture parameter of the imaging device 1 in time series. The end point icon A12 receives an input of an instruction signal for setting an end point serving as a reference for setting the capture parameter control information that changes the capture parameter of the imaging device 1 in time series. The return icon A13 receives an input of an instruction signal for making a transition to an immediately preceding menu screen or to an initial state. That is, the second control unit 28 determines whether the return icon A13 (see FIG. 5B) to be displayed in the second display unit 24 has been touched. When the second control unit 28 determines that return is selected via the second touch panel 25 (Step S201: Yes), the external device 2 proceeds to Step S222 described below. On the other hand, when the second control unit 28 determines that return is not selected via the second touch panel 25 (Step S201: No), the external device 2 proceeds to Step S202 described below.

In Step S202, the second control unit 28 determines whether start point setting is selected by the user by touching the start point icon A11 via the second touch panel 25. When the second control unit 28 determines that the start point setting is selected (Step S202: Yes), the external device 2 proceeds to Step S203 described below. On the other hand, when the second control unit 28 determines that the start point setting is not selected (Step S202: No), the external device 2 proceeds to Step S207 described below.

In Step S203, the setting unit 28a sets the angle of view or the start point of the focal position of the capture parameter control information that changes the capture parameter of the first imaging unit 11 in time series at movie capture of the imaging device 1 (the angle of view information and the focal position information) according to content operated via the second touch panel 25 or the second operating unit 26. After Step S203, the external device 2 proceeds to Step S204 described below In this case, as illustrated in FIGS. 5B and 5C, after the user touches the start point icon A11 via the second touch panel 25 (see FIG. 5B), the second display control unit 28c superimposes the return icon A13, an angle of view icon A21, a change icon A22, an adoption icon A23, a focus icon A31, a change icon A32, an adoption icon A33, and a start point icon A111 on the live view image LV1, and causes the second display unit 24 to display the superimposed image.

The change icon A22 receives an input of an instruction signal for changing the angle of view of the imaging device 1. The adoption icon A23 receives an input of an instruction signal for adopting the angle of view of the imaging device 1 changed by the user. The change icon A32 receives an input of an instruction signal for changing the focal position of the imaging device 1. The adoption icon A33 receives an input of an instruction signal for adopting the focal position of the imaging device 1. With such ingenuity, trial and error and simulation may be performed in advance, and an optimum effect may be provided under necessary circumstances. Since this effect provision is determined in advance, the photographer may concentrate on framing such as composition.

Figure 5C:
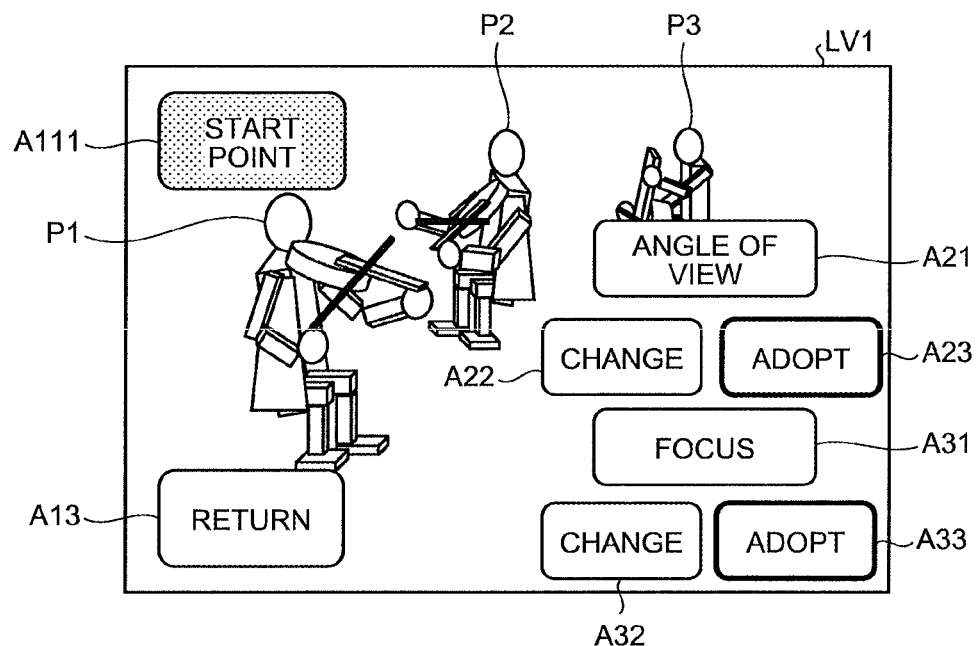
FIG. 5C is a diagram illustrating an example of an image displayed by the external device according to the first embodiment.

In the situation illustrated in FIG. 5C, for example, when the user touches an object P3 via the second touch panel 25, the setting unit 28a sets a current focal position (for example, a region including the object P3) of the imaging device 1 as the start point of the focal position that serves as a reference for temporally altering the capture parameter of the first imaging unit 11 (the focal position information). Further, in the situation illustrated in FIG. 5C, the setting unit 28a sets a current angle of view (an angle of view corresponding to the live view image LV1) of the imaging device 1 as the start point of the angle of view that serves as a reference for temporally altering the capture parameter of the imaging device 1 (the angle of view information), according to a pinch operation to expand or reduce a distance between two touch positions different from each other via the second touch panel 25.

Next, when the adoption icon A23 or the adoption icon A33 is touched via the second touch panel 25 (Step S204: Yes), the setting unit 28a provisionally records a start point parameter as the capture parameter of the first imaging unit 11 to the second recording unit 27 (Step S205). To be specific, in the situation illustrated in FIG. 5C, when the adoption icon A23 or the adoption icon A33 is touched via the second touch panel 25, the setting unit 28a provisionally records the capture parameter set according to the operation up to the point of time to the second recording unit 27 as the start point parameter. After Step S205, the external device 2 returns to Step S201 described above.

When the adoption icon A23 or the adoption icon A33 is not touched via the second touch panel 25 in Step S204 (Step S204: No), the external device 2 proceeds to Step S206.

Next, when the return icon A13 is touched via the second touch panel 25 (Step S206: Yes), the external device 2 returns to Step S201 described above. On the other hand, when the return icon A13 is not touched via the second touch panel 25 (Step S206: No), the external device 2 returns to Step S203 described above.

In Step S207, the second control unit 28 determines whether the start point setting is selected by the user by touching the end point icon A12 via the second touch panel 25. When the second control unit 28 determines that the end point setting is selected (Step S207: Yes), the external device 2 proceeds to Step S208 described below. On the other hand, when the second control unit 28 determines that the end point setting is not selected (Step S207: No), the external device 2 proceeds to Step S212 described below.

Figure 5D:
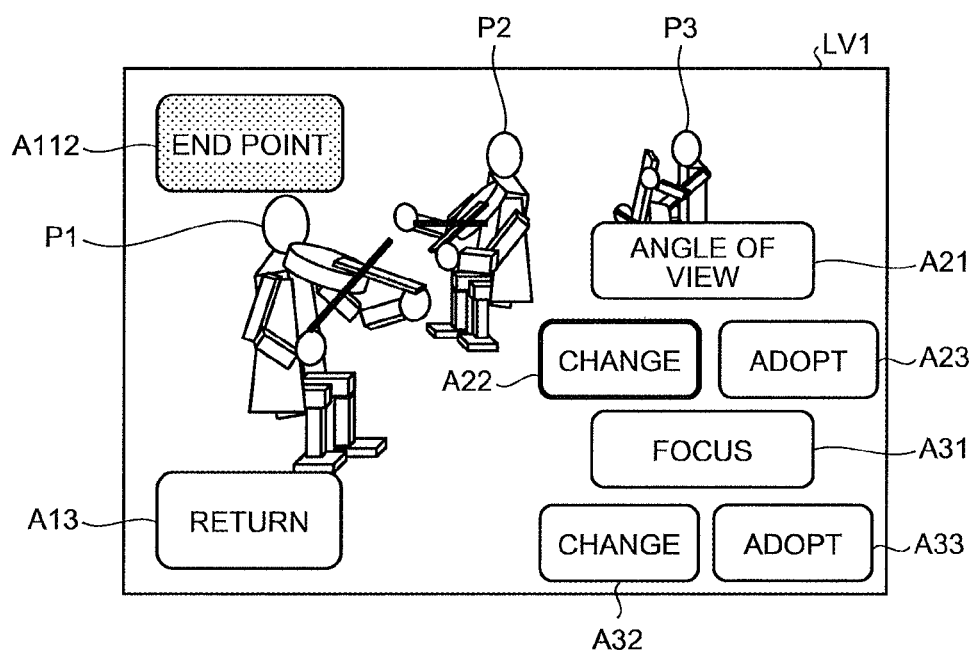
FIG. 5D is a diagram illustrating an example of an image displayed by the external device according to the first embodiment.

In Step S208, the setting unit 28a sets the angle of view or the end point of the focal position of the capture parameter control information that changes the capture parameter of the first imaging unit 11 in time series at movie capture of the imaging device 1 according to content operated via the second touch panel 25 or the second operating unit 26. After Step S208, the external device 2 proceeds to Step S209 described below. In this case, as illustrated in FIGS. 5B and 5D, after the user touches the end point icon A12 via the second touch panel 25 (see FIG. 53), the second display control unit 28c superimposes the return icon A13, the angle of view icon A21, the change icon A22, the adoption icon A23, the focus icon A31, the change icon A32, the adoption icon A33, and an end point icon A112 on the live view image LV1, and causes the second display unit 24 to display the superimposed image. Further, when the change icon A22 is touched via the second touch panel 25, the second display control unit 28c superimposes an angle of view change icon A211 indicating that the angle of view of the imaging device 1 may be changed on the live view image LV1 and causes the second display unit 24 to display the superimposed image according to the touch operation (see FIG. 5E).

Figure 5E:
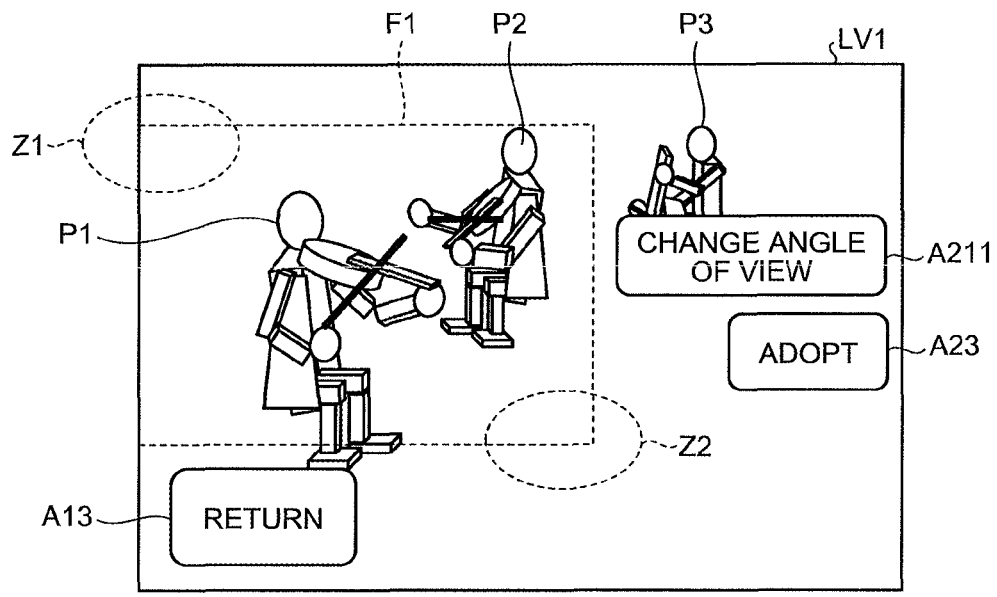
FIG. 5E is a diagram illustrating an example of an image displayed by the external device according to the first embodiment.

In the situation illustrated in FIG. 5E, for example, when the user performs a pinch operation to expand or reduce a distance between two touch positions Z1 and Z2 that are different from each other via the second touch panel 25 and selects a region F1 including an object P1 and an object P2, the setting unit 28a sets the end point of the angle of view of the capture parameter of the imaging device 1 in such a manner that the region F1 is sequentially temporally altered from the start point that is the current angle of view (the angle of view corresponding to the live view image LV1) of the imaging device 1 to become the angle of view of the end point (angle of view information).

Figure 5F:
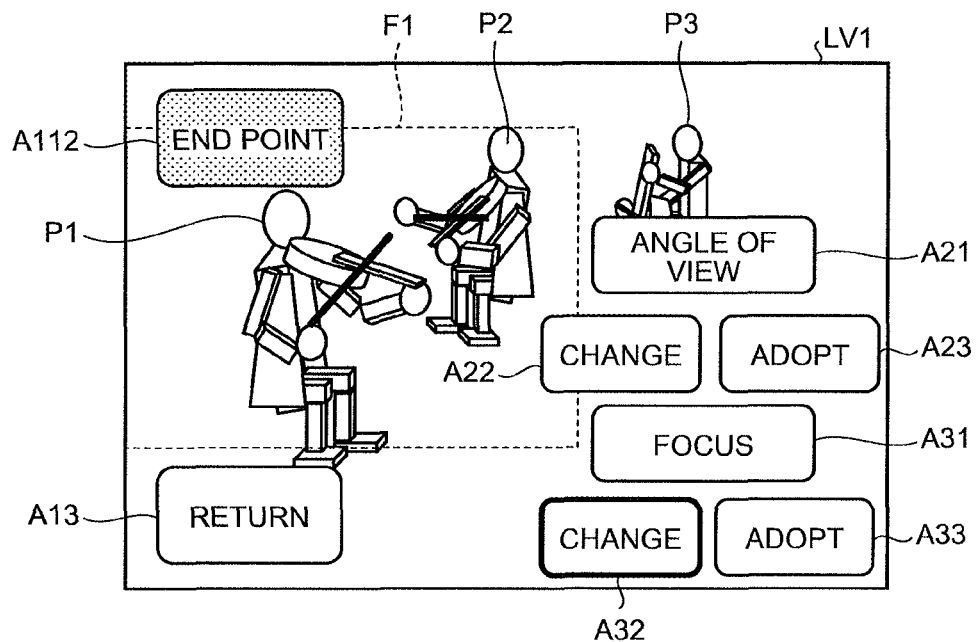
FIG. 5F is a diagram illustrating an example of an image displayed by the external device according to the first embodiment.
Figure 5G:
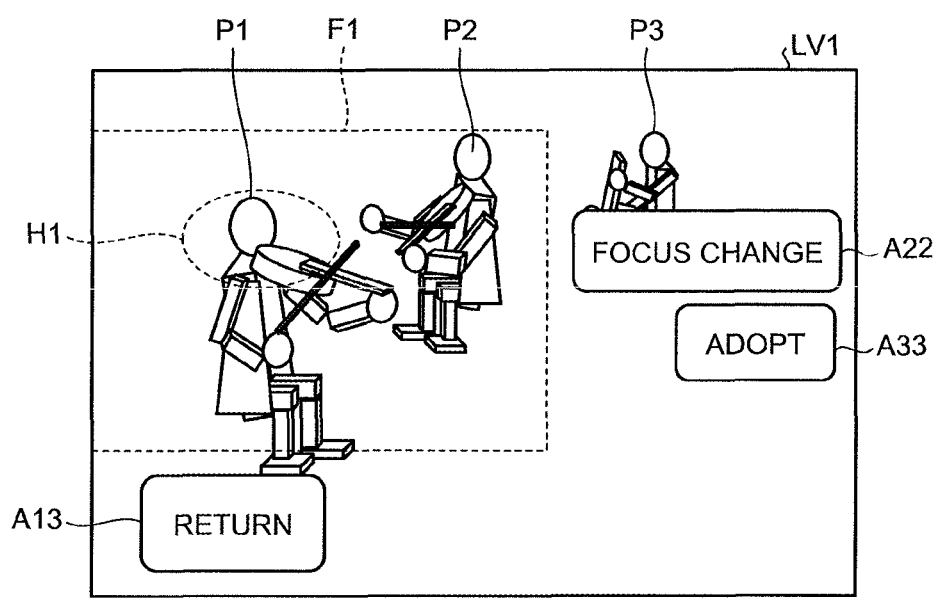
FIG. 5G is a diagram illustrating an example of an image displayed by the external device according to the first embodiment.

Further, as illustrated in FIG. 5F, when the change icon A32 is touched via the second touch panel 25, the second display control unit 28c superimposes a Focus change icon A212 indicating that the focal position of the imaging device 1 may be changed on the live view image LV1 and causes the second display unit 24 to display the superimposed image according to the touch operation (see FIG. 5G). In the situation illustrated in FIG. 5G, for example, when the user touches the face of the object P1 via the second touch panel 25, the setting unit 28a sets the end point of the focal position of the capture parameter of the imaging device 1 in such a manner that a region H1 including the face of the object P1 is sequentially temporally altered from the start point that is the current focal position of the imaging device 1 to become the focal position of the end point (focal position information).

In Step S209, when the adoption icon A23 or the adoption icon A33 is touched via the second touch panel 25 (Step S209: Yes), the setting unit 28a provisionally records an end point parameter as the capture parameter to the second recording unit 27 (Step S210). After Step S210, the external device 2 returns to Step S201 described above.

When the adoption icon A23 or the adoption icon A33 is not touched via the second touch panel 25 in Step S209 (Step S209: No), the external device 2 proceeds to Step S211.

Next, when the return icon A13 is touched via the second touch panel 25 (Step S211: Yes), the external device 2 returns to Step S201. On the other hand, when the return icon A13 is not touched via the second touch panel 25 (Step S211: No), the external device 2 returns to Step S208 described above.

In Step S212, the second control unit 28 determines whether the start condition setting is selected via the second touch panel 25. When the second control unit 28 determines that the start point setting is selected (Step S212: Yes), the external device 2 proceeds to Step S213 described below. On the other hand, when the second control unit 28 determines that the start point setting is not selected (Step S212: No), the external device 2 proceeds to Step S217 described below.

In Step S213, the setting unit 28a sets the start condition of the capture parameter control information that changes the capture parameter of the first imaging unit 11 in time series at movie capture of the imaging device 1 according to content operated via the second touch panel 25 or the second operating unit 26. For example, when the change amount (motion vector) of the object (movie data) is a predetermined value or more between temporally successive images, the setting unit 28a sets a start condition of the capture parameter to be temporally altered in the movie capture of the imaging device 1. Of course, other than the change amount of the object, a case where the acceleration caused in the external device 2 has a predetermined threshold or more, or a case where the sound data (input value) of sound recorded at the movie capture has a predetermined value or more is set as the start condition. Of course, a touch to the second touch panel 25 may be simply set as the start condition, or timing when the second imaging unit 20 captures an image may be set as the start condition. After Step S213, the external device 2 proceeds to Step S214 described below.

In Step S214, when the adoption icon to adopt the start condition to start a transition is touched via the second touch panel 25 (Step S214: Yes), the setting unit 28a provisionally records the start condition as the capture parameter to the second recording unit 27 (Step S215). After Step S215, the external device 2 returns to Step S201 described above.

When the adoption icon to adopt the start condition to start a transition is not touched via the second touch panel 25 in Step S214 (Step S214: No), the external device 2 proceeds to Step S216.

Next, when the return icon A13 is touched via the second touch panel 25 (Step S216: Yes), the external device 2 returns to Step S201 described above. On the other hand, when the return icon A13 is not touched via the second touch panel 25 (Step S216: No), the external device 2 returns to Step S213 described above.

In Step S217, the second control unit 28 determines whether transition time setting is selected via the second touch panel 25. When the second control unit 28 determines that the transition time setting is selected (Step S217: Yes), the external device 2 proceeds to Step S218 described below. On the other hand, when the second control unit 28 determines that the transition time setting is not selected (Step S217: No), the external device 2 proceeds to Step S201.

In Step S218, the setting unit 28a sets a transition time from a start point to an end point, which is the transition time from start to end of the capture parameter control at the movie capture of the imaging device 1, according to the content operated via the second touch panel 25 or the second operating unit 26. For example, the setting unit 28a sets the transition time from a start point to an end point according to the operation of the second touch panel 25 (time information). At this time, the second display control unit 28c may superimpose a time bar on the live view image LV1 and causes the second display unit 24 to display the superimposed image so that the user may intuitively grasp the transition time, or may simply superimpose a scrollable time on the live view image LV1 and causes the second display unit 24 to display the superimposed image. Of course, the setting unit 28a may set the transition time according to the operation of the second operating unit 26. After Step S218, the external device 2 proceeds to Step S219 described below.

FIG. 6 is a diagram schematically illustrating change patterns determined according to either one of the focal position information and angle of view information, and the time information. In FIG. 6, the case where the focal position information, the angle of view information, and the time information are set in Steps S203 and S208 will be described. However, the present embodiment is not limited thereto, and the change pattern is determined according to either one of the focal position information and the angle of view information, and the time information. In FIG. 6, the horizontal axis represents the start time (Ttrg=0), and (a) of FIG. 6 illustrates the transition of a focal length (angle of view) and (b) of FIG. 6 illustrates the transition of the focal position. Further, in FIG. 6, a curve L1 indicates the transition of the focal length of the zoom lens unit 11a, and a curve L2 indicates the transition of the focal position of the focus lens unit 11b. Further, in FIG. 6, an image W1 schematically illustrates an image at the start time Ttrg (start point) of the capture parameter control, and an image W2 schematically illustrates an image at end Tp (end point) of the capture parameter control. As described above, the user may not perform capture with a desired effect unless treating various variables such as timing and an angle of view even in a simple zoom operation. Of course, in addition to or other than the operation, there may also be an operation to change the exposure and focus (focal position) at the same time, and thus the operation is not just a work load that may be handled by one photographer at the same time as capturing things that are happening right now. A desired movie may not be obtained without ingenuity in acceleration, allocation, and assignation of such work. Here, use in capture and recording is mainly assumed. However, at observation without recording, observation setting in the next scene, object, or condition may be naturally and comfortably performed without waste by such ingenuity, and smooth observation and check may be performed.

The setting unit 28a sets the transition time from a start point to an end point, which is the transition time from start to end of the capture parameter control at the movie capture of the imaging device 1, according to the content operated via the second touch panel 25 or the second operating unit 26. As a result, as illustrated in FIG. 6, the setting unit 28a may set the change pattern indicating temporal change of the capture parameter according to at least either one of the focal position information and the angle of view information, and the time information. As illustrated by the curves L1 and L2 in FIG. 6, the change pattern is set to gradually increase the focal length (decrease the angle of view) and to gradually focus the focal position from infinity (∞) toward the near side. That is, the setting unit 28a sets the change pattern to nonlinearly change the focal length and the focal position. Of course, the setting unit 28a may set the change pattern to linearly change the focal length and the focal position.

In Step S219, when the adoption icon to adopt the transition time is touched via the second touch panel 25 (Step S219: Yes), the setting unit 28a provisionally records the transition time as the capture parameter to the second recording unit 27 (Step S220). After Step S220, the external device 2 returns to Step S201 described above.

When the adoption icon to adopt the transition time is not touched via the second touch panel 25 in Step S219 (Step S219: No), the external device 2 proceeds to Step S221.

Next, when the return icon A13 is touched via the second touch panel 25 (Step S221: Yes), the external device 2 returns to Step S201 described above. On the other hand, when the return icon A13 is not touched via the second touch panel 25 (Step S221: No), the external device 2 returns to Step S218 described above.

In Step S222, the second control unit 28 determines whether the setting condition of the capture parameter provisionally recorded in the second recording unit 27 is appropriate. When the second control unit 28 determines that the setting condition of the capture parameter provisionally recorded in the second recording unit 27 is appropriate (Step S222: Yes), the external device 2 returns to the main routine in FIG. 2. On the other hand, when the second control unit 28 determines that the setting condition of the capture parameter provisionally recorded in the second recording unit 27 is not appropriate (Step S222: No), the external device 2 proceeds to Step S223.

Next, the second display control unit 28c causes the second display unit 24 to display a warning notifying that the specified condition of the captured parameter provisionally recorded in the second recording unit 27 is not appropriate (Step S223).

After that, when there is an operation to re-set the capture parameter via the second touch panel 25 or the second operating unit 26 (Step S224: Yes), the external device 2 returns to Step S201. On the other hand, when there is no operation to re-set the capture parameter via the second touch panel 25 or the second operating unit 26 (Step S224: No), the external device 2 returns to the main routine in FIG. 2.

Description of Step S115 and subsequent steps will be continued referring back to FIG. 2.

Figure 7:
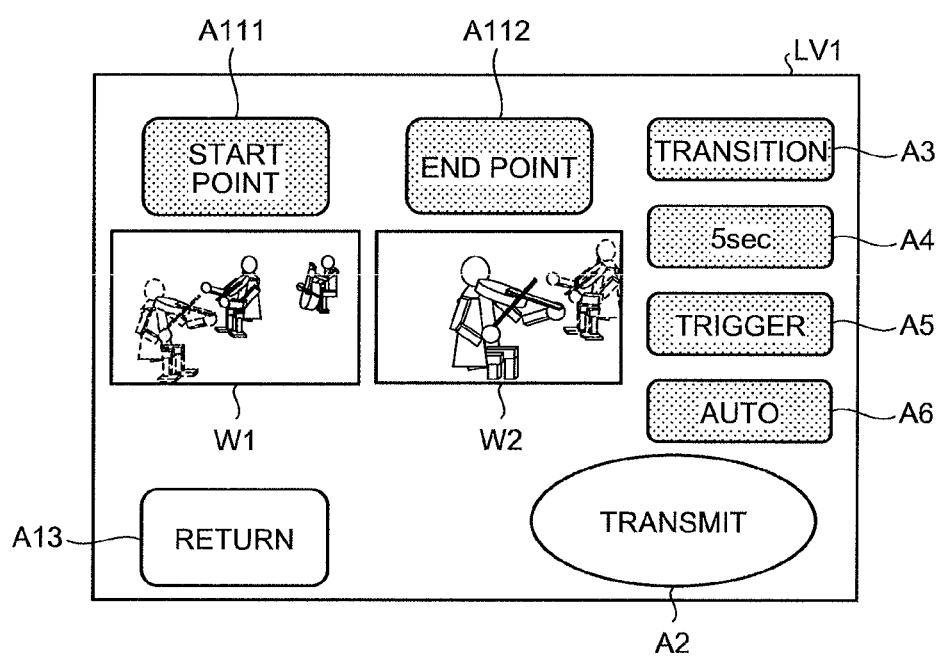
FIG. 7 is a diagram illustrating an example of an image displayed by the external device according to the first embodiment.

In Step S115, the transmission control unit 28b transmits the capture parameter control information to the imaging device 1 via the second communication unit 21. In this case, as illustrated in FIG. 7, the second display control unit 28c superimposes the start point icon A111, the image W1 corresponding to the start point set by the user, the end point icon A112, the image W2 corresponding to the end point, a transition icon A3, a 5 sec A4 indicating the transition time, a trigger A5 for starting alternation of the capture parameter, an AUTO icon A6 indicating the content of the trigger A5, and a transmission icon A2 for accepting a signal for transmitting the capture parameter to the imaging device 1 on the live view image LV1, and causes the second display unit 24 to display the superimposed image. At this time, when the transmission icon A2 is touched via the second touch panel 25, the transmission control unit 28b transmits the capture parameter control information illustrated in FIG. 7 to the imaging device 1 via the second communication unit 21. To be specific, the transmission control unit 28b transmits, as the capture parameter control information, the capture parameter of the first imaging unit 11 before and after alternation in a transition period from start to end of the capture parameter alternation control, a transition time indicating a time of the transition period from start to end of the capture parameter alternation control, and a change pattern indicating temporal change of the capture parameter of the first imaging unit 11. To be more specific, the transmission control unit 28b transmits at least either one of the focal position information specifying the focal positions of the first imaging unit 11 at the start and at the end of the transition period, and the angle of view information specifying the angles of view of the first imaging unit 11 at the start and at the end of the transition period, as the capture parameter before and after alternation in the transition period from start to end of the capture parameter alternation control. Alternatively, the transmission control unit 28b transmits at least either one of the focal position information specifying the focal position of the first imaging unit 11 at the end of the transition period, and the angle of view information specifying the angle of view of the first imaging unit 11 at the start and the end of the transition period, as the capture parameter before and after alternation in the transition period from start to end of the capture parameter alternation control. Note that the transmission control unit 28b may transmit, as the capture parameter control information, a start condition for starting the capture parameter alternation control by the imaging device 1. The image communication and the capture parameter communication may be communicated by different communication standards and different circuits and antennas may be selectively used to enable both communications at the same time.

After that, when an instruction signal for terminating the cooperation mode cooperating with the imaging device 1 is input via the second touch panel 25 or the second operating unit 26 (Step S116: Yes), the external device 2 proceeds to Step S117 described below. On the other hand, when the instruction signal for terminating the cooperation mode cooperating with the imaging device 1 is not input via the second touch panel 25 or the second operating unit 26 (Step S116: No), the external device 2 proceeds to Step S111 described above.

In Step S117, when an instruction signal for termination is input via the second touch panel 25 or the second operating unit 26 (Step S117: Yes), the external device 2 terminates the present processing. On the other hand, when the instruction signal for termination is not input via the second touch panel 25 or the second operating unit 26 (Step S117: No), the external device 2 returns to Step S101 described above.

In Step S118, when there is a capture operation to instruct the imaging device 1 to perform still image capture or movie capture via the second touch panel 25 or the second operating unit 26 (Step S118: Yes), the transmission control unit 28b transmits the instruction signal instructing still image capture or movie capture to the imaging device 1 via the second communication unit 21 (Step S119). After Step S119, the external device 2 proceeds to Step S116. The image communication and the capture instruction communication may be communicated by different communication standards and different circuits and antennas may be selectively used to enable both communications at the same time. Since the information amount of communication for capture or for various types of setting is small, the communication is stabilized if the communication is performed that does not disturb transmission of images. It goes without saying that such information may be included and communicated in the communication of images.

In Step S118, when there is no capture operation to instruct the imaging device 1 to perform still image capture or movie capture via the second touch panel 25 or the second operating unit 26 (Step S118: No), the external device 2 proceeds to Step S120 described below.

Next, when another operation is performed via the second touch panel 25 or the second operating unit 26 (Step S120: Yes), the transmission control unit 28b transmits information according to the operation to the imaging device 1 via the second communication unit 21 (Step S121). For example, when an instruction signal instructing an additional signal for adding a timestamp or a log to the movie data captured by the imaging device 1 is input via the second touch panel 25, the transmission control unit 28b transmits the instruction signal for adding a timestamp or a log via the second communication unit 21. After Step S121, the external device 2 proceeds to Step S116. The image communication and the operation information communication may be communicated by different communication standards and different circuits and antennas may be selectively used to enable both communications at the same time.

In Step S122, the external device 2 executes processing according to the selected mode. For example, the external device 2 performs transmission/reception of e-mails or talk with other devices. After Step S122, the external device 2 proceeds to Step S117.

[Processing by Imaging Device]

Figure 8:
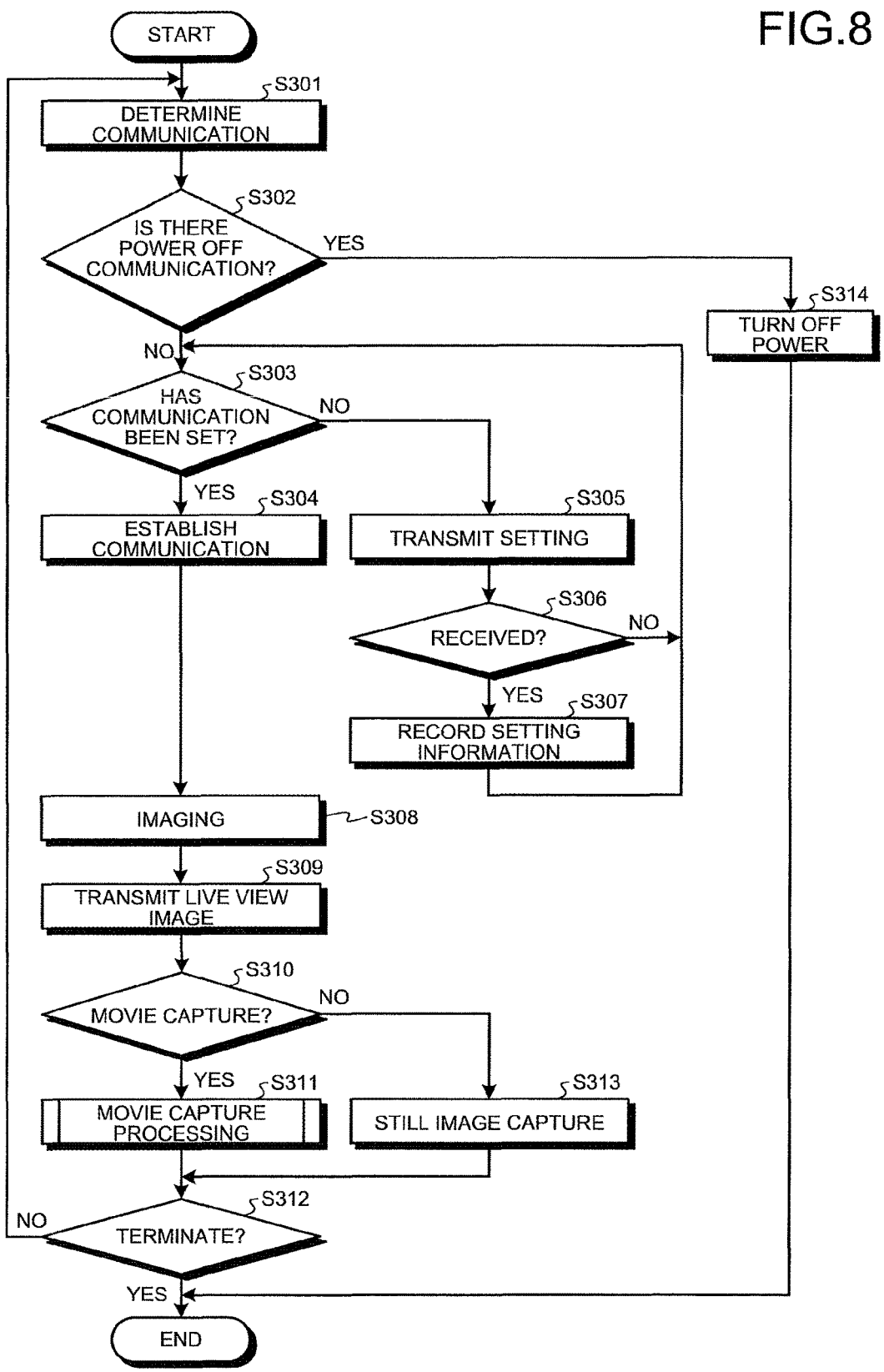
FIG. 8 is a flowchart illustrating an outline of processing executed by an imaging device according to the first embodiment.

Next, processing executed by the imaging device 1 will be described. FIG. 8 is a flowchart illustrating an outline of processing executed by the imaging device 1.

As illustrated in FIG. 8, first, the first control unit 18 determines communication via the first communication unit 16 (Step S301), and when power-off communication of the imaging device 1 is performed via the first communication unit 16 (Step S302: Yes), the imaging device 1 proceeds to Step S314 described below. On the other hand, when there is no power-off communication of the imaging device 1 via the first communication unit 16 (Step S302: No), the imaging device 1 proceeds to Step S303 described below.

In Step S303, when various types of information for performing bidirectional communication have been set with the external device 2 (Step S303: Yes), the first control unit 18 establishes communication with a specified external device 2 (Step S304), and the imaging device 1 proceeds to Step S308 described below.

In Step S303, when the various types of information for performing bidirectional communication have not been set with the external device 2 (Step S303: No), the first control unit 18 transmits the setting information regarding the imaging device 1 itself to the external device 2 via the first communication unit 16 (Step S305).

Next, when the setting information is received from the external device 2 via the first communication unit 16 (Step S306: Yes), the first control unit 18 records the setting information received from the external device 2 to the first recording unit 17 (Step S307). After Step S307, the imaging device 1 returns to Step S303 described above.

In Step S306, when the setting information is not received from the external device 2 via the first communication unit 16 (Step S306: No), the imaging device 1 returns to Step S303 described above.

In Step S308, the first control unit 18 causes the first imaging unit 11 to execute imaging to generate a live view image.

Next, the first control unit 18 transmits the live view image input from the image processing unit 12 to the external device 2 via the first communication unit 16 (Step S309).

After that, when an instruction signal instructing movie capture is input from the first operating unit 14 or an instruction signal instructing movie capture is input from the external device 2 via the first communication unit 16 (Step S310: Yes), the imaging device 1 executes movie capture processing of sequentially imaging an object to generate movie data configured from a plurality of temporally successive image data (Step S311). Note that details of the movie capture processing will be described below. After Step S311, the imaging device 1 proceeds to Step S312 described below.

Next, when an instruction signal for terminating capture is input from the first operating unit 14 or an instruction signal for terminating capture is input from the external device 2 via the first communication unit 16 (Step S312: Yes), the imaging device 1 terminates the present processing. On the other hand, when the instruction signal for terminating capture is not input from the first operating unit 14 or the instruction signal for terminating capture is not input from the external device 2 via the first communication unit 16 (Step S312: No), the imaging device 1 returns to Step S301 described above.

In Step S310, when an instruction signal instructing movie capture is not input from the first operating unit 14 or an instruction signal instructing movie capture is not input from the external device 2 via the first communication unit 16 (Step S310: No), the imaging device 1 executes still image capture (Step S313). In this case, when an instruction signal instructing still image capture is input from the external device 2 via the first communication unit 16, the imaging device 1 causes the first imaging unit 11 to execute capture to perform the still image capture. At this time, the imaging device 1 records the image data generated by the still image capture to the first recording unit 17. Note that the imaging device 1 may transmit the image data generated by the first imaging unit 11 to the external device 2 via the first communication unit 16. After Step S313, the imaging device 1 proceeds to Step S312.

In Step S314, the imaging device 1 turns off the power. After Step S314, the imaging device 1 terminates the present processing.

Movie Capture Processing

Figure 9:
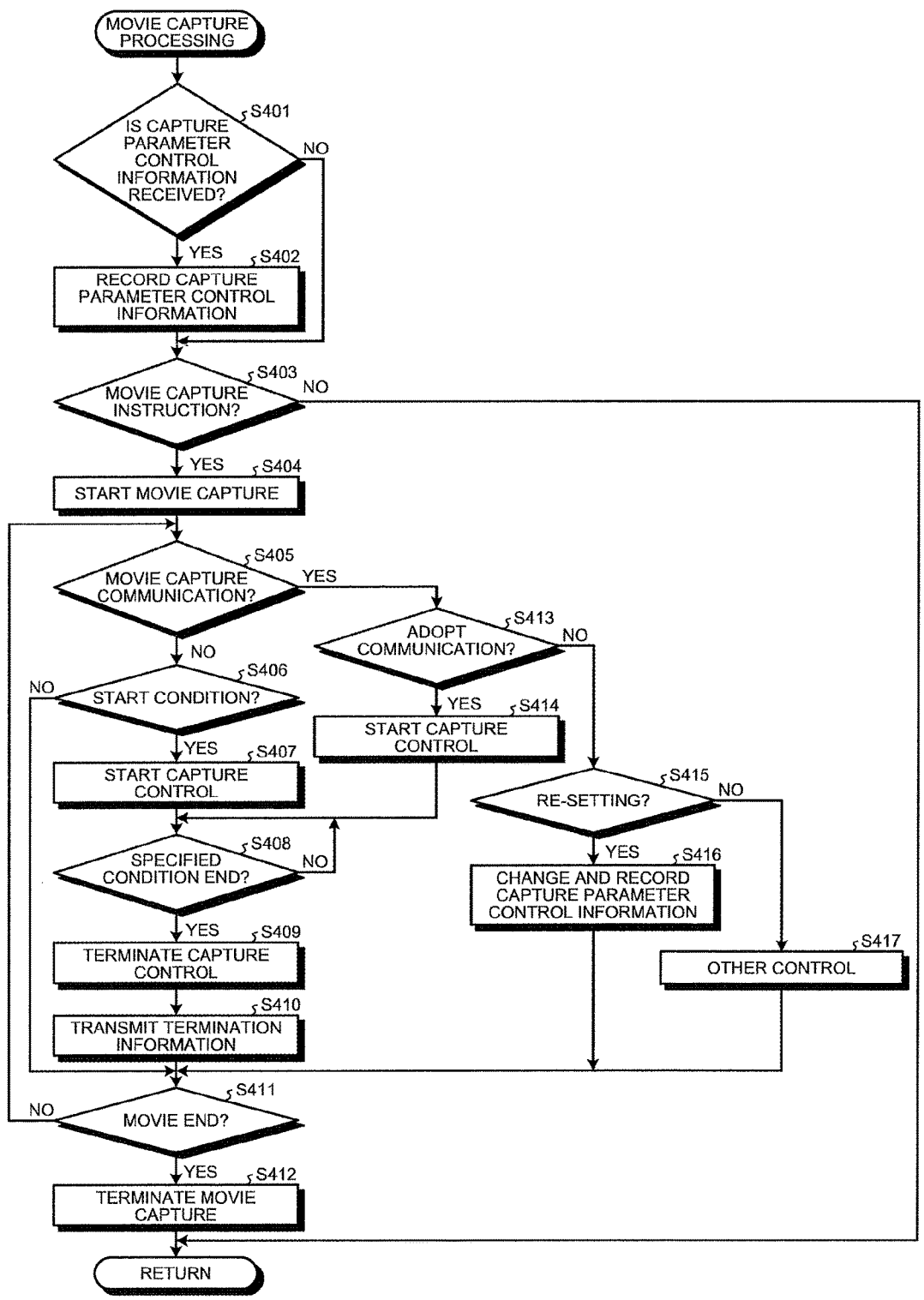
FIG. 9 is a flowchart illustrating an outline of movie capture processing of FIG. 8.

Next, the movie capture processing described in Step S311 of FIG. 8 will be described. FIG. 9 is a flowchart illustrating an outline of the movie capture processing.

First, as illustrated in FIG. 9, when the capture parameter control information is received from the external device 2 via the first communication unit 16 (Step S401: Yes), the first control unit 18 records the capture parameter control information to the first recording unit 17 (Step S402). After Step S402, the imaging device 1 proceeds to Step S403 described below. On the other hand, when the capture parameter control information has not been received from the external device 2 via the first communication unit 16 (Step S401: No), the imaging device 1 proceeds to Step S403 described below.

Next, when the instruction signal instructing movie capture is input from the external device 2 via the first communication unit 16 (Step S403: Yes), the imaging device 1 starts the movie capture (Step S404). To be specific, the imaging device 1 performs the movie capture of sequentially recording image data, which is sequentially generated by the first imaging unit 11, to the image data recording unit 17a in a time series manner. On the other hand, when the instruction signal instructing movie capture is not input from the external device 2 via the first communication unit 16 (Step S403: No), the imaging device 1 returns to the main routine in FIG. 8.

In Step S405, when movie capture communication of receiving the capture parameter control information from the external device 2 via the first communication unit 16 is performed (Step S405: Yes), the imaging device 1 proceeds to Step S413 described below. On the other hand, when the movie capture communication of receiving the capture parameter control information from the external device 2 via the first communication unit 16 is not performed (Step S405: No), the imaging device 1 proceeds to Step S406 described below.

In Step S406, the determination unit 18c determines whether the start condition included in the capture parameter control information recorded in the first recording unit 17 is satisfied. To be specific, the determination unit 18c determines whether it gets to a specified time that is the start condition included in the capture parameter control information from when the movie capture is started based on clocking from the first clock unit 13. Note that the determination unit 18c may determine whether it gets to the start timing by determining whether the motion vector (the change amount of the movie) of the object included in the image corresponding to the image data generated by the first imaging unit 11 becomes a predetermined threshold or more, or may determine whether it gets to the start timing by determining whether the sound volume of the sound data input from the sound input/output unit 15 becomes a predetermined threshold or more, as the start condition included in the capture parameter control information, other than the time. Of course, as the start condition, whether the object specified in the start condition may be detected in the image corresponding to the image data generated by the first imaging unit 11 may be determined. Further, as the start condition, whether it gets to the start timing may be determined by determining whether posture information transmitted from the external device 2 matches preset posture information. When the determination unit 18c determines that the start condition included in the capture parameter control information recorded in the first recording unit 17 is satisfied (Step S406: Yes), the imaging device 1 proceeds to Step S407.

Figure 10A:
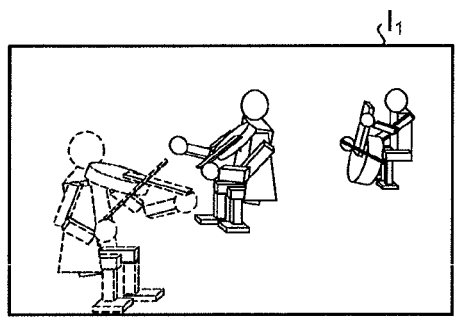
FIG. 10A is a diagram illustrating an example of a movie obtained through movie capture by the imaging device according to the first embodiment.
Figure 10B:
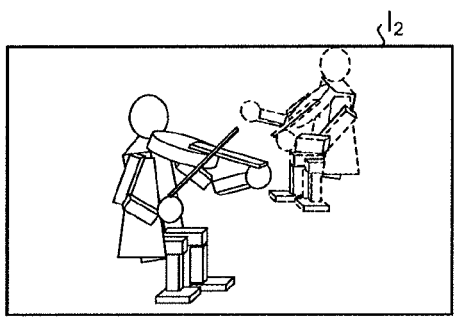
FIG. 10B is a diagram illustrating an example of a movie obtained through movie capture by the imaging device according to the first embodiment.
Figure 10C:
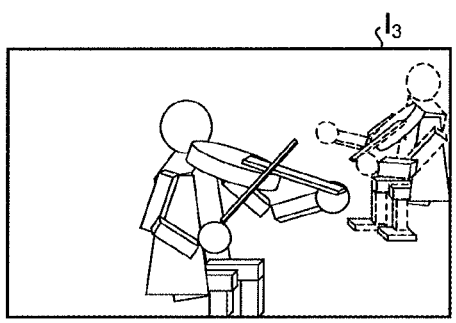
FIG. 10C is a diagram illustrating an example of a movie obtained through movie capture by the imaging device according to the first embodiment.

In Step S407, the capture control unit 18a starts the capture control of the first imaging unit 11 based on the capture parameter control information. As a result, as illustrated in FIGS. 10A to 10C, the imaging device 1 may obtain the movie (an image $I_1$ in FIG. 10A→an image $I_2$ in FIG. 10B→an image $I_3$ in FIG. 10C) to which the focus effect to alter the focal position and the zoom effect to alter the angle of view are added. Note that FIGS. 10A to 10C illustrate the image $I_1$, the image $I_2$, and the image $I_3$ corresponding to frames of the representative movie data for convenience of description. However, a plurality of image data (frames) is included between the images. Note that, in the first embodiment, the zoom effect is added by the zoom lens unit 11a. However, the embodiment is not limited thereto, and a zoom effect (electronic zoom) may be added by trimming processing by the image processing unit 12, for example. Of course, the zoom effect may be added by optical zoom by the zoom lens unit 11a and electronic zoom by the image processing unit 12.

Next, the transition period from the start point to the end point included in the capture parameter control information ends (Step S408: Yes), the capture control unit 18a terminates the capture control of the first imaging unit 11 (Step S409).

After that, the capture control unit 18a transmits termination information indicating that the capture parameter control has been terminated to the external device 2 via the first communication unit 16 (Step S410).

Next, when the instruction signal instructing termination of the movie capture is input from the external device 2 via the first communication unit 16 (Step S411: Yes), the imaging device 1 terminates the movie capture (Step S412). After Step S412, the imaging device 1 returns to the main routine in FIG. 8.

In Step S406, when the capture control unit 18a determines that the start condition included in the capture parameter control information recorded in the first recording unit 17 is not satisfied (Step S406: No), the imaging device 1 proceeds to Step S411.

In Step S408, when the specified condition included in the capture parameter control information has not ended (Step S408: No), this determination is repeated until the specified condition ends.

In Step S411, when the instruction signal for terminating the movie capture is not input from the external device 2 via the first communication unit 16 (Step S411: No), the imaging device 1 returns to Step S405 described above.

In Step S413, when an instruction signal for adapting the capture parameter control information is input from the external device 2 via the first communication unit 16 during the movie capture of the imaging device 1 (Step S413: Yes), the capture control unit 18a starts capture control of the first imaging unit 11 based on the capture parameter control information (Step S414). After Step S414, the imaging device 1 proceeds to Step S408.

In Step S413, when the instruction signal for adapting the capture parameter control information is not input from the external device 2 via the first communication unit 16 during the movie capture of the imaging device 1 (Step S413: No), the imaging device 1 proceeds to Step S415 described below.

Next, when an instruction signal for re-setting the capture parameter control information is input from the external device 2 via the first communication unit 16 (Step S415:

Yes), the capture control unit 18*a* changes and records the capture parameter control information recorded in the capture parameter control information recording unit 17*b* with new capture parameter control information received from the external device 2 via the first communication unit 16 (Step S416). After Step S416, the imaging device 1 proceeds to Step S411.

In Step S415, when the instruction signal for re-setting the capture parameter control information is not input from the external device 2 via the first communication unit 16 (Step S415: No), the imaging device 1 performs other control (Step S417). For example, when the imaging device 1 receives information indicating a timestamp of the movie data from the external device 2 via the first communication unit 16, the imaging device 1 adds the timestamp to a position of the movie data, the position corresponding to the time when the timestamp has been received. Of course, in addition to the timestamp, when text data is input from the external device 2, for example, the imaging device 1 adds the text data to the movie data. After Step S417, the imaging device 1 proceeds to Step S411.

According to the above-described first embodiment, the capture control unit 18*a* causes the first imaging unit 11 to execute the movie capture while performing the capture parameter alternation control to change the capture parameter of the first imaging unit 11 in time series at the movie capture, based on the capture parameter control information instructing alternation of the capture parameter of the first imaging unit 11, the alternation being changed in time series, the capture parameter control information having been received from the external device 2, before or during the movie capture. Therefore, the movie to which the desired transition effect has been easily added may be captured even during capture of the movie.

Further, according to the first embodiment, the capture control unit 18*a* starts the capture parameter alternation control when the instruction signal instructing the capture parameter alternation control is input from an outside. Therefore, the user of the imaging device 1 may capture the movie to which the desired transition effect has been easily added only by concentrating on the capture.

Further, according to the first embodiment, the capture control unit 18*a* starts the capture parameter alternation control when the determination unit 18*c* determines that it gets to the start timing. Therefore, the movie to which the transition effect desired by the user U1 has been easily added may be captured.

Second Embodiment

Next, a second embodiment will be described. An imaging system according to the second embodiment is different from the imaging device 1 of the imaging system 100 according to the first embodiment described above in configuration, movie capture processing executed by an imaging device, and processing executed by an external device. Hereinafter, the configuration of the imaging system according to the second embodiment will be described, and then the movie capture processing executed by the imaging device and the processing executed by the external device according to the second embodiment will be described. Note that the same configuration as that of the imaging system 100 according to the above-described first embodiment is denoted with the same sign, and description thereof is omitted.

Configuration of Imaging System

Figure 11:
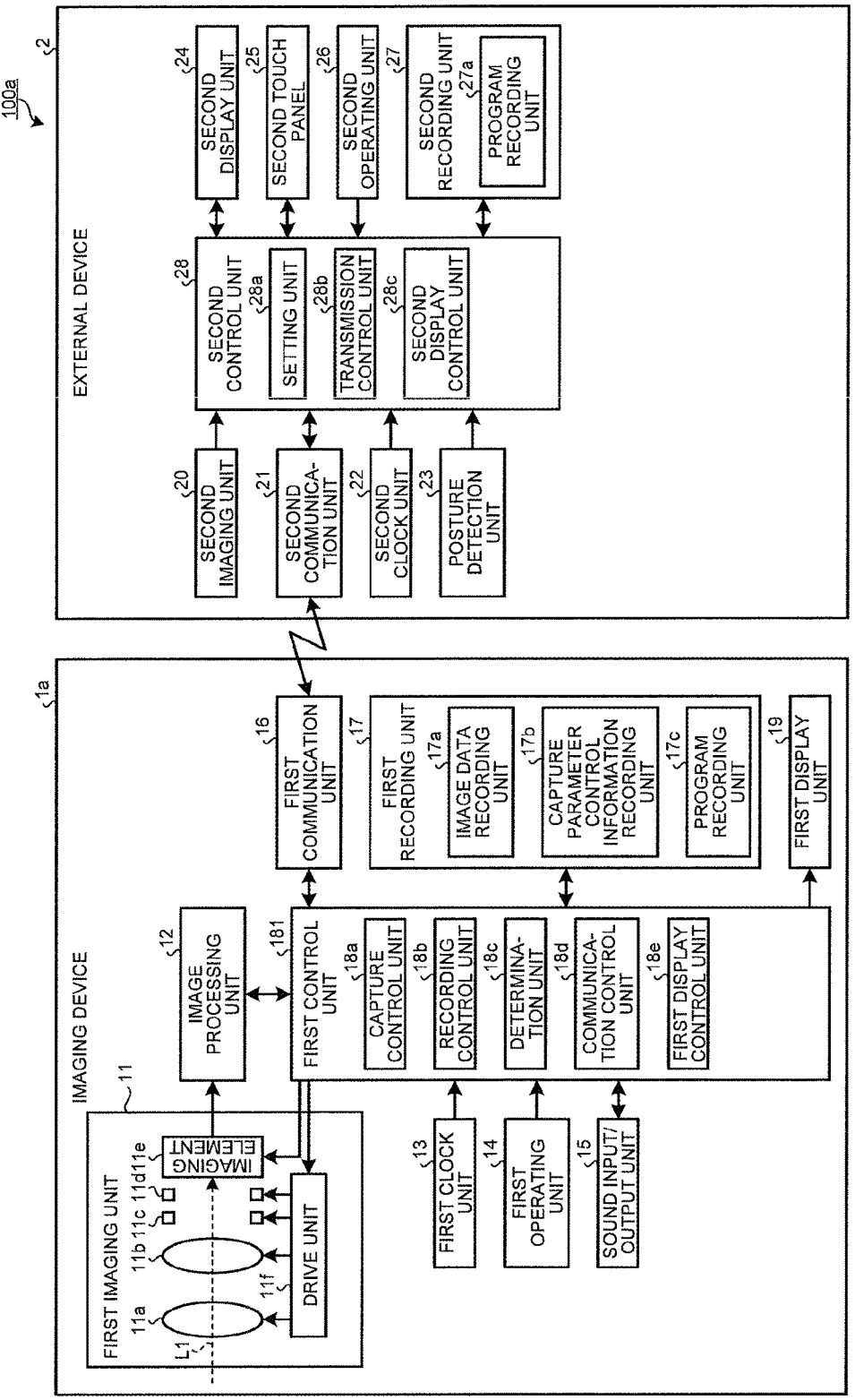
FIG. 11 is a block diagram illustrating a functional configuration of an imaging system according to a second embodiment.

FIG. 11 is a block diagram illustrating a functional configuration of an imaging system according to a second embodiment; An imaging system 100*a* illustrated in FIG. 11 includes an imaging device 1*a* in place of the imaging device 1 of the imaging system 100 according to the above-described first embodiment.

Configuration of Imaging Device

The imaging device 1*a* further includes a first display unit 19 that displays an image corresponding to image data generated by a first imaging unit 11 and various types of information regarding the imaging device 1*a* under control of a first control unit 181, in addition to the configuration of the imaging device 1 according to the above-described first embodiment. Further, the imaging device 1*a* includes the first control unit 181 in place of the above-described first control unit 18.

The first display unit 19 is configured from liquid crystal or organic EL. Further, the first display unit 19 may be, for example, an electronic viewfinder, other than being provided on a back side of the imaging device 1*a*.

The first control unit 181 integrally controls the units that configure the imaging device 1*a*. The first control unit 181 is configured from a general-purpose processor such as a CPU, an FPGA, or an ASIC. The first control unit 181 further includes a first display control unit 18*e* in addition to the configuration of the first control unit 18 according to the above-described first embodiment.

The first display control unit 18*e* controls a display mode of the first display unit 19. To be specific, when advice information of movie capture is input from the external device 2 via a first communication unit 16, the first display control unit 18*e* causes the first display unit 19 to display the advice information. Further, the first display control unit 18*e* causes the first display unit 19 to display various types of information regarding the imaging device 1*a*.

Processing by External Device

Figure 12:
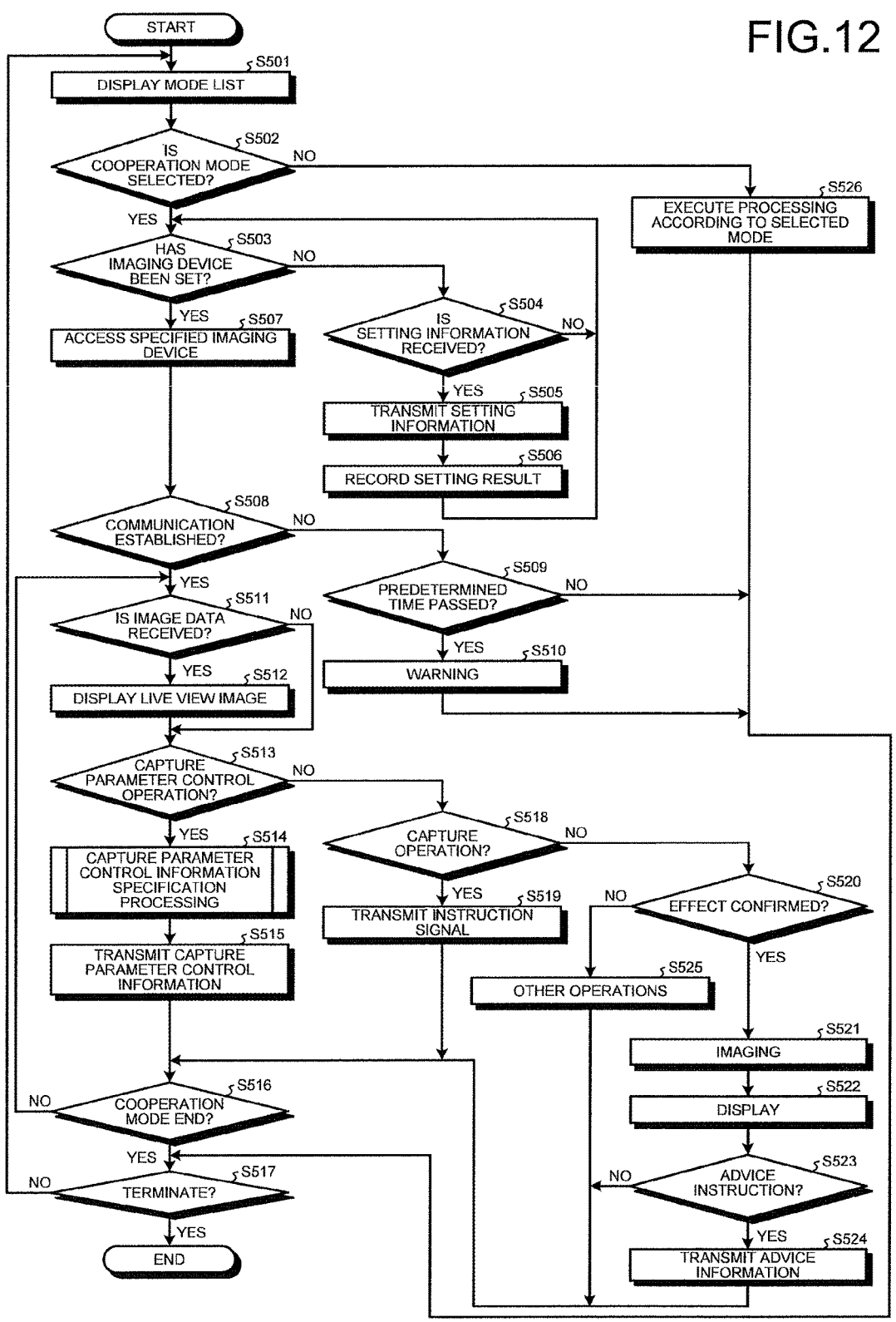
FIG. 12 is a flowchart illustrating an outline of processing executed by an external device according to the second embodiment.

Next, processing executed by the external device 2 will be described. FIG. 12 is a flowchart illustrating an outline of processing executed by the external device 2. In FIG. 12, Steps S501 to S519 and Step S526 respectively correspond to Steps S101 to S119 and Step S122 of FIG. 2, described above.

In Step S520, when an effect of the movie capture of the imaging device 1*a* is confirmed (Step S520: Yes), a second control unit 28 causes a second imaging unit 20 to execute imaging (Step S521), and causes a second display unit 24 to display an image corresponding to image data generated by the second imaging unit 20 (Step S522).

Figure 13:
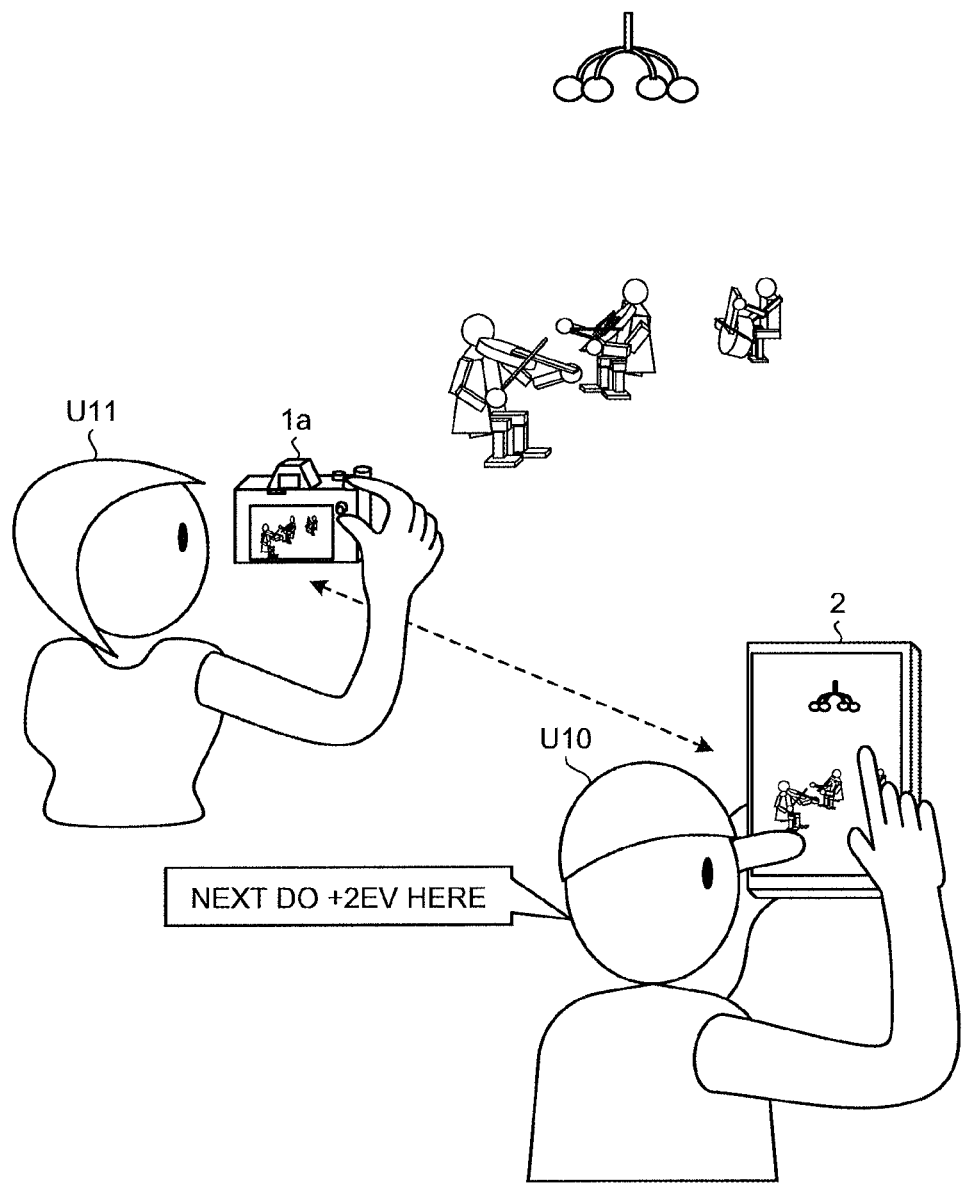
FIG. 13 is a diagram illustrating a situation where a movie is captured using the imaging system according to the second embodiment.

Next, advice is instructed to the movie capture of the imaging device 1*a* (Step S523: Yes), a transmission control unit 28*b* transmits the advice information to the imaging device 1*a* via a second communication unit 21 (Step S524). After Step S524, the external device 2 proceeds to Step S516. To be specific, as illustrated in FIG. 13, a user U10 of the external device 2 is often located at a position farther than a user U11 of the imaging device 1*a*, and thus the user U10 may grasp a situation of the movie capture from a more objective viewpoint than the user U11 of the imaging device 1*a*. Therefore, as illustrated in FIG. 13, the user U10 of the external device 2 gives an advice (next, do +2EV here) during movie capture to the user U11 of the imaging device 1*a* by imaging an object with the external device 2 and transmitting the image corresponding to the image data obtained by the capture to the imaging device 1*a*. That is, the transmission control unit 28*b* transmits the image data captured by the second imaging unit 20 to the imaging device 1*a* via the second communication unit 21 as the advice information. Note that the transmission control unit 28b transmits at least information input via a second touch panel 25, for example, information specifying a region including the object, or text data input via the second touch panel 25 or a second operating unit 26 to the imaging device 1a as the advice information, other than the image data. As is apparent from the example of concert recording illustrated in FIG. 13, objects move to a great extent, and it is difficult to provide an optimum effect corresponding to the situation that changes from moment to moment in movie acquisition (movie capture). Meanwhile, if some form of effect is not provided to the movie, later editing becomes troublesome, and if the editing is not performed, an image with visual quality may not be obtained. According to the second embodiment, the user U11 (photographer) may concentrate on framing and the user U10 (assistant) may supplement it. Further, the user U10 (assistant) may immediately respond to the situation that changes from moment to moment and may cooperate to provide the next effect. Therefore, the effect may be suitable for the scene, and trial and error according to the situation is also possible, and thus optimum effect may be provided without adversely affecting the captured image. Since assistance by the assistant may be similar under certain circumstances, a robot may learn characteristics of the assistance for each scene and may act as the assistant. Of course, the present application also assumes and covers a case in which the photographer is a robot that concentrates on framing of an object under control of a specific program, and the assistant is a human who assists the robot.

In Step S523, when no advice is instructed to the movie capture of the imaging device 1a (Step S523: No), the external device 2 proceeds to Step S516.

In Step S520, when the effect of movie capture by the imaging device 1a is not confirmed (Step S520: No), the external device 2 performs processing according to other operations (Step S525). After Step S525, the external device 2 proceeds to Step S516.

Movie Capture Processing

Figure 14:
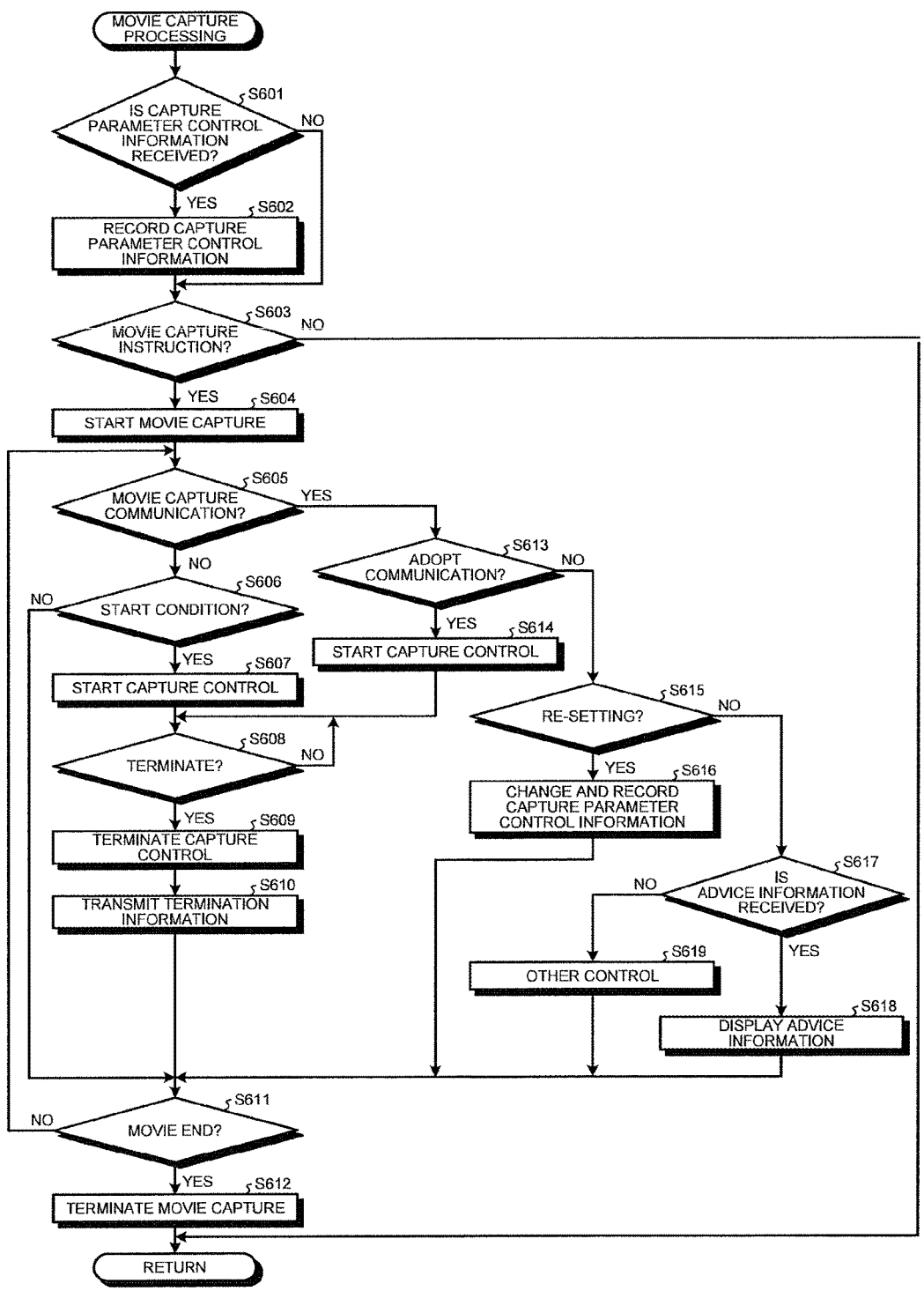
FIG. 14 is a flowchart illustrating an outline of movie capture processing according to the second embodiment.

Next, movie capture processing executed by the imaging device 1a will be described. FIG. 14 is a flowchart illustrating an outline of movie capture processing executed by the imaging device 1a. Steps S601 to S616 and Step S619 respectively correspond to Steps S401 to S417 of FIG. 9, described above.

In Step S617, the first control unit 181 determines whether the advice information of the movie capture has been received from the external device 2 via the first communication unit 16. When the first control unit 181 determines that the advice information of the movie capture has been received from the external device 2 via the first communication unit 16 (Step S617: Yes), the imaging device 1a proceeds to Step S618 described below. On the other hand, when the first control unit 181 determines that the advice information of the movie capture has not been received from the external device 2 via the first communication unit 16 (Step S617: No), the imaging device 1a proceeds to Step S619.

Figure 15:
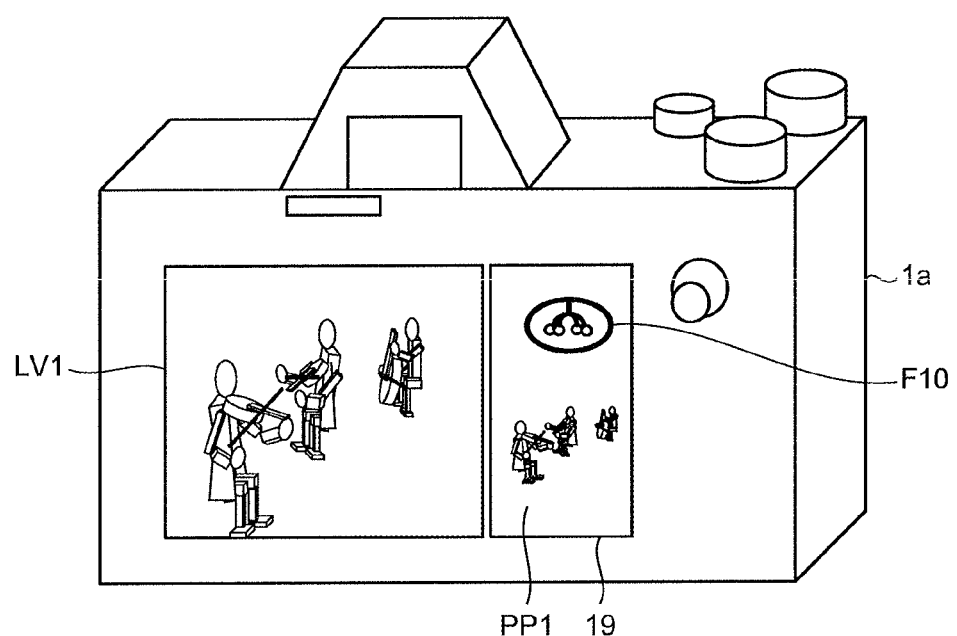
FIG. 15 is a diagram illustrating an example of an image displayed by an imaging device according to the second embodiment.

In Step S618, the first display control unit 18e causes the first display unit 19 to display the advice information of movie capture received from the external device 2 via the first communication unit 16. After Step S618, the imaging device 1a proceeds to Step S611. To be specific, as illustrated in FIG. 15, the first display control unit 18e causes the first display unit 19 to display an advice image PP1 corresponding to the advice information of the movie capture from the external device 2 via the first communication unit 16. Further, a region F10 including an object instructed by the user of the external device 2 is emphasized and displayed in the first display unit 19. In this case, the first display control unit 18e causes the first display unit 19 to display a live view image LV1 corresponding to the movie data sequentially captured by the first imaging unit 11 and the advice image PP1 in parallel. Of course, the first display control unit 18e does not need to display the live view image LV1 and the advice image PP1 in parallel, and may superimpose the advice image PP1 on the live view image LV1 and cause the first display unit 19 to display the superimposed image, for example.

Figure 16A:
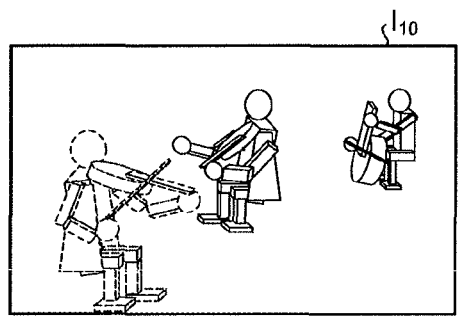
FIG. 16A is a diagram illustrating an example of a movie obtained through movie capture by the imaging device according to the second embodiment.
Figure 16B:
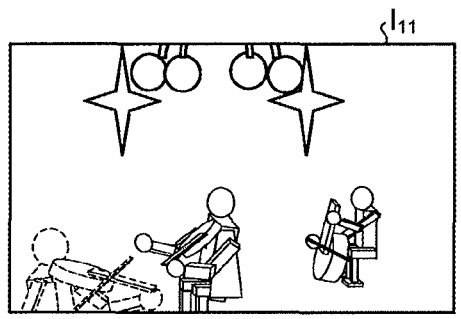
FIG. 16B is a diagram illustrating an example of a movie obtained through movie capture by the imaging device according to the second embodiment.
Figure 16C:
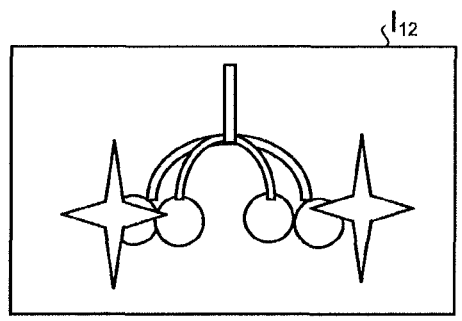
FIG. 16C is a diagram illustrating an example of a movie obtained through movie capture by the imaging device according to the second embodiment.

Further, the first display control unit 18e does not need to cause the first display unit 19 to display all of the advice image PP1, and may trim only the region F10 specified by the user U10 of the external device 2 and superimpose the region F10 on the live view image LV1, and cause the first display unit 19 to display the superimposed image. Still further, the first display control unit 18e may superimpose text data included in the advice information, for example, "capture an upper section" or the capture parameter control information, for example, "set the exposure value to +2 and the diaphragm to F8" on the live view image LV1, and cause the first display unit 19 to display the superimposed image. Of course, the advice information includes an exposure value, a focal position, a diaphragm value, ISO sensitivity, a shutter speed, white balance, an angle of view, an object capturable at a maximum angle of view or a minimum angle of view of the first imaging unit 11, a shooting mode, and the like. As a result, even if the user U11 of the imaging device 1a does not notice attractive objects in a region capturable in the movie capture or does not have room in operation of a capture parameter of the movie capture because the user U11 concentrates on the capture, the user U11 may notice the objects by the advice by the user U10 of the external device 2. As a result, as illustrated in FIGS. 16A to 16C, the imaging device 1a may obtain movie data by movie capture according to the advice of the user U10 of the external device 2 (an image $I_{10}$ in FIG. 16A→an image $I_{11}$ in FIG. 16B→an image $I_{12}$ in FIG. 16C) under the operation of the user U11. As a result, transition effects that reflect other's opinions may be added.

According to the above-described second embodiment, the desired transition effect may be added prior to or by sharing capture of the moment even during capture of a movie. Therefore, the user may concentrate on transition effect provision and capture confirmation, may perform capture with accurate framing in immediate response to a situation and with optimum effects, and image display and confirmation.

Further, according to the second embodiment, when the first display control unit 18e receives the advice information at the movie capture from the external device 2, the first display unit 19 displays the advice information. Therefore, transition effects that reflect other's opinions may be added.

Other Embodiments

Further, the imaging device according to the present disclosure may be applied to medical display devices and industrial display devices, such as endoscopes and microscopes using movies by images imaged for observation or diagnosis, in addition to electronic devices such as a digital still camera assuming capture and recording, a digital video camera, a tablet portable device having an imaging function. In particular, in a case where an observer is not necessarily one person and many members check the image as a team, members who concentrate on observation and members who share the operation perform work in cooperation with one another, thereby to perform efficient work without failure. Even in a case where one person performs capture, the person may separately perform the framing operation and the parameter operation. Application for the purpose of display for observation without performing the above-mentioned capture control is possible. Here, the effect processing is left to the angle of view and focus. However, special image processing, special light observation, and the like may be controlled, and these effects may be used in combination. With ingenuity of the present application, trial and error of optimum image observation, recording, and the like corresponding to various situations, scenes, and objects may be comfortably performed. Effect provision control prior to an object scene (including an object), rather than the moment of capture when the object scene has arrived, becomes possible. Since trial and error may be performed for the operation, capture with a desired effect is possible. As a result, an optimum image desired by the user may be obtained. This operation for the desired effect may be performed while viewing a live view image or an imaging result under the circumstances, and thus the image may be made suitable for the scene.

Further, the program executed by the imaging device according to the present disclosure may be provided by being stored in a computer-readable recording medium such as a CD-ROM, a flexible disk (FD), a CD-R, a digital versatile disk (DVD), a USB medium, or a flash memory as file data in an installable format or an executable format.

Further, the program executed by the imaging device according to the present disclosure may be stored in a computer connected to a network such as the Internet, and provided by being downloaded via the network. Furthermore, the program executed by the imaging device according to the present disclosure may be provided or distributed via a network such as the Internet.

Furthermore, in the above-described embodiment, the parts described as a unit (or a section) may be configured from a dedicated circuit or a combination of a plurality of general-purpose circuits, or may be configured from a combination of a microprocessor that operates according to preprogrammed software, a processor such as a CPU, or a sequencers, as needed. A part or all of the control may be designed to be undertaken by an external device, and in this case, a wired or wireless communication circuit lies. Here, a communication unit is specifically noted for simplicity. However, embodiments in which the characteristic processing or supplementary processing of the present application is performed by an external device such as a server or a personal computer are also assumed. That is, the present application covers a case where a plurality of devices cooperates to establish the characteristics of the present disclosure. Bluetooth (registered trademark), Wi-Fi (registered trademark), a telephone line, or the like is used for the communication in this case. Further, the communication in this case may be performed by a USB or the like. A dedicated circuit, a general-purpose circuit, and a control unit may be integrated as an ASIC. Such an apparatus or system may have functions to give some action to the user, change an angle of parts, or the like, and its mechanism is configured from various actuators and a coupling mechanism as needed, and the actuator operates by a driver circuit. This driver circuit is also controlled by a microprocessor microcomputer, an ASIC, or the like according to a specific program. Such control may be corrected and adjusted in detail according to information output by various sensors and peripheral circuits thereof.

In the description of the flowchart in this specification, context of the processing between steps is clearly indicated using expressions such as "first", "after that", "next", and the like. However, the order of the processing necessary for implementing the present disclosure is not uniquely determined by those expressions. That is, the order of the processing in the flowcharts described in the present specification may be changed without inconsistency. Further, the order of the processing is not limited by the program composed of simple branch processing, and a larger number of determination items may be comprehensively determined and the processing may be branched. In that case, artificial intelligence techniques that learn machine learning while urging the user to perform manual operation and repeating learning may be used in combination. Also, artificial intelligence techniques may be brought to learn operation patterns performed by many experts and conduct deep learning in a form of incorporating more complicated conditions.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
a capture control unit configured to control the imaging device to execute movie capture while performing capture parameter alternation control based on capture parameter control information received from an external device, the capture parameter control information:
instructing alternation of a capture parameter, the alternation being changed in time series; and
including a start condition for starting the capture parameter alternation control, the start condition being a threshold of a movie corresponding to movie data with respect to a change amount, and
a determination unit configured to determine whether current timing is start timing of the capture parameter alternation control based on the start condition, wherein:
the capture control unit starts the capture parameter alternation control when the determination unit determines that the current timing is the start timing, and
the determination unit determines that the current timing is the start timing when the change amount of the movie data exceeds the threshold.

2. An imaging device comprising:
a capture control unit configured to control the imaging device to execute movie capture while performing capture parameter alternation control based on capture parameter control information received from an external device, the capture parameter control information:
instructing alternation of a capture parameter, the alternation being changed in time series; and
including a start condition for starting the capture parameter alternation control;
a determination unit configured to determine whether current timing is start timing of the capture parameter alternation control based on the start condition; and a sound acquisition unit configured to acquire sound information and generate sound data of the acquired sound information, wherein:
  the capture control unit starts the capture parameter alternation control when the determination unit determines that the current timing is the start timing,
  the start condition is a threshold of the sound data with respect to a sound volume, and
  the determination unit determines that the current timing is the start timing when the sound volume of the sound data exceeds the threshold.

3. An imaging device comprising:
a capture control unit configured to control the imaging device to execute movie capture while performing capture parameter alternation control based on capture parameter control information received from an external device, the capture parameter control information:
  instructing alternation of a capture parameter, the alternation being changed in time series; and
  including a start condition for starting the capture parameter alternation control; and
a determination unit configured to determine whether current timing is start timing of the capture parameter alternation control based on the start condition, wherein:
the capture control unit starts the capture parameter alternation control when the determination unit determines that the current timing is the start timing,
the start condition is a posture state of an external device that transmits the capture parameter control information, and
the determination unit determines that the current timing is the start timing when posture information indicating a posture of the external device, the posture information being sequentially transmitted from the external device, becomes a preset posture state.

* * * * *